(12) United States Patent
Lee et al.

(10) Patent No.: US 7,864,286 B2
(45) Date of Patent: Jan. 4, 2011

(54) DISPLAY DEVICE AND METHOD WITH METAL SUBSTRATE INCLUDING A PIXEL ARRAY AND STORAGE CAPACITOR IN COMBINATION IN WHICH PLURAL STORAGE LINES CONNECTED THERETO ARE CONNECTED TO THE METAL SUBSTRATE

(75) Inventors: Kyoung Mook Lee, Ansan-si (KR); Sung Hwan Kim, Suwon-si (KR); Sang Soo Kim, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 388 days.

(21) Appl. No.: 11/967,995

(22) Filed: Dec. 31, 2007

(65) Prior Publication Data

US 2008/0225215 A1 Sep. 18, 2008

(30) Foreign Application Priority Data

Mar. 13, 2007 (KR) .................... 10-2007-0024612

(51) Int. Cl.
*G02F 1/1333* (2006.01)
(52) U.S. Cl. ..................................... 349/158
(58) Field of Classification Search .......... 349/158–160
See application file for complete search history.

(56) References Cited

U.S. PATENT DOCUMENTS 6,531,993 B1 * 3/2003 Yamazaki et al. ............. 345/55

2005/0285843 A1 12/2005 Yoshinaga et al.

FOREIGN PATENT DOCUMENTS

| CN | 1372242 A | 10/2002 |
|---|---|---|
| JP | 2004-297074 | 10/2004 |
| JP | 2005-275102 | 10/2005 |
| JP | 2005-292579 | 10/2005 |
| JP | 2005-301308 | 10/2005 |
| JP | 2006-146205 | 6/2006 |

OTHER PUBLICATIONS

Office Action issued in corresponding Chinese Patent Application No. 200710300458.9; issued Jul. 17, 2009.
Office Action issued in corresponding Chinese Patent Application No. 200710300458.9; issued May 26, 2010.

* cited by examiner

*Primary Examiner*—John Heyman
(74) *Attorney, Agent, or Firm*—Brinks Hofer Gilson & Lione

(57) ABSTRACT

A display device and a method of manufacturing the same is disclosed, to prevent a parasitic capacitance caused by a metal substrate. The display device comprises a metal substrate including a pixel array provided with a plurality of storage lines to supply a storage voltage, and a supplying line connected to the storage lines; and a voltage source, connected to the supplying line, which generates the storage voltage, wherein the metal substrate is connected to any one of an output terminal of the voltage source, the supplying line and the storage lines.

14 Claims, 27 Drawing Sheets

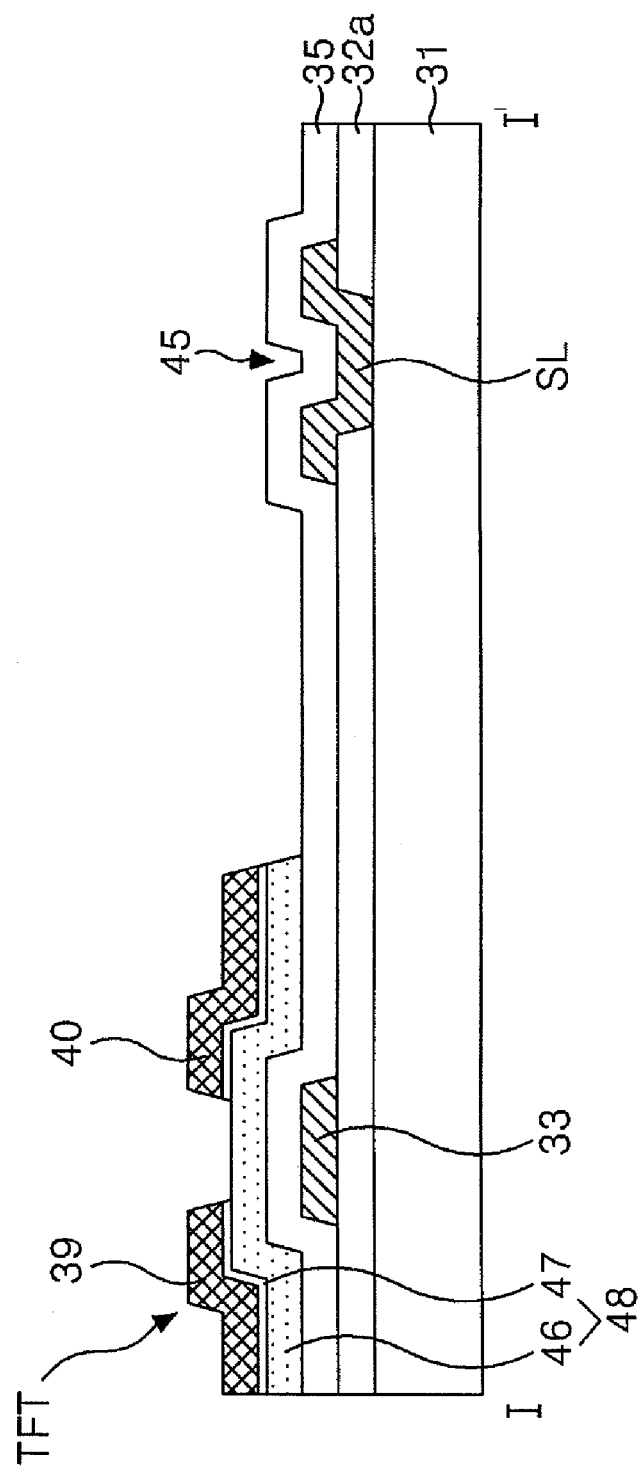

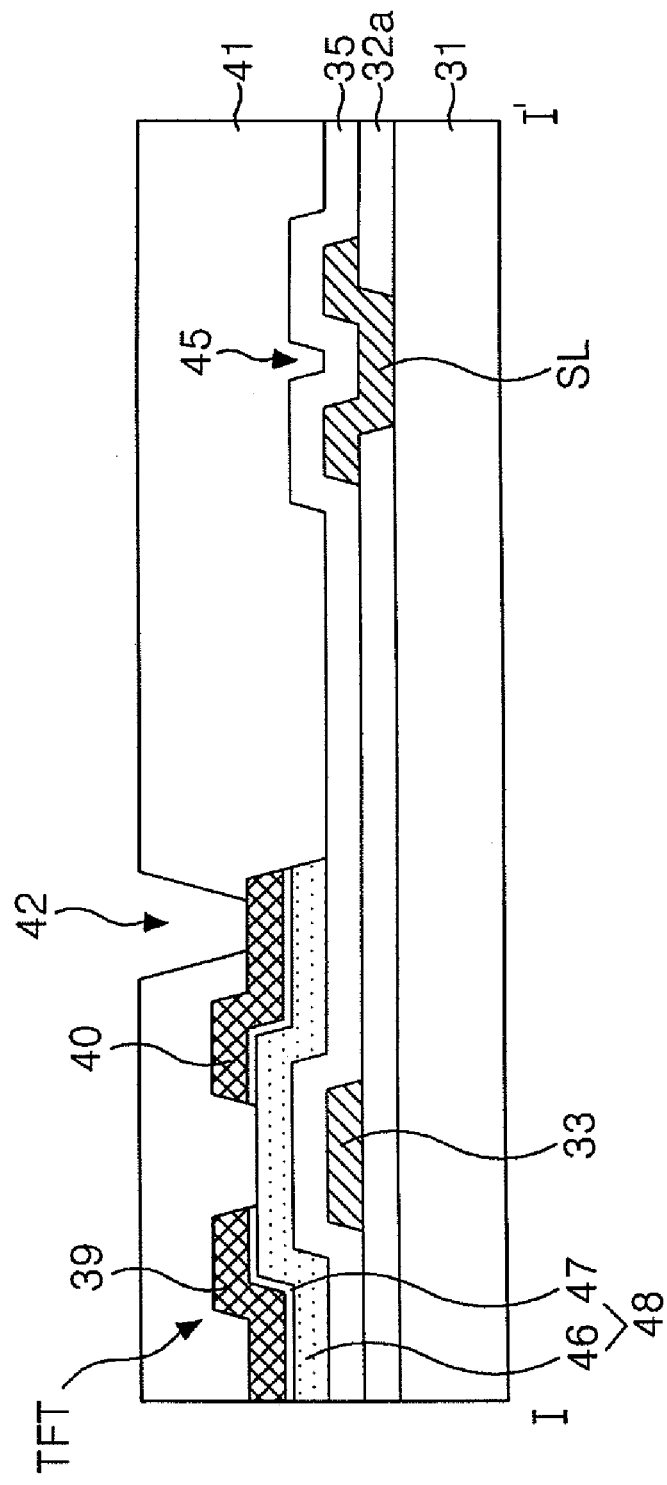

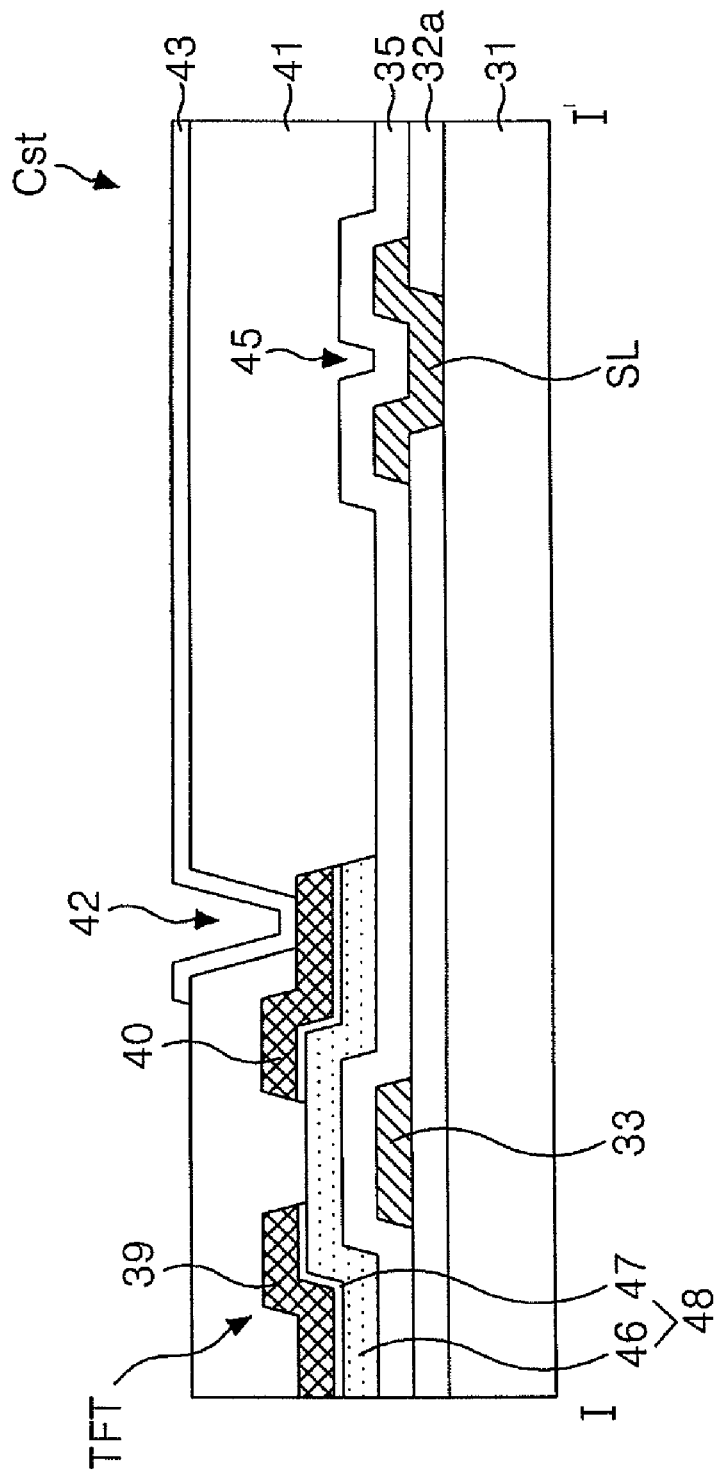

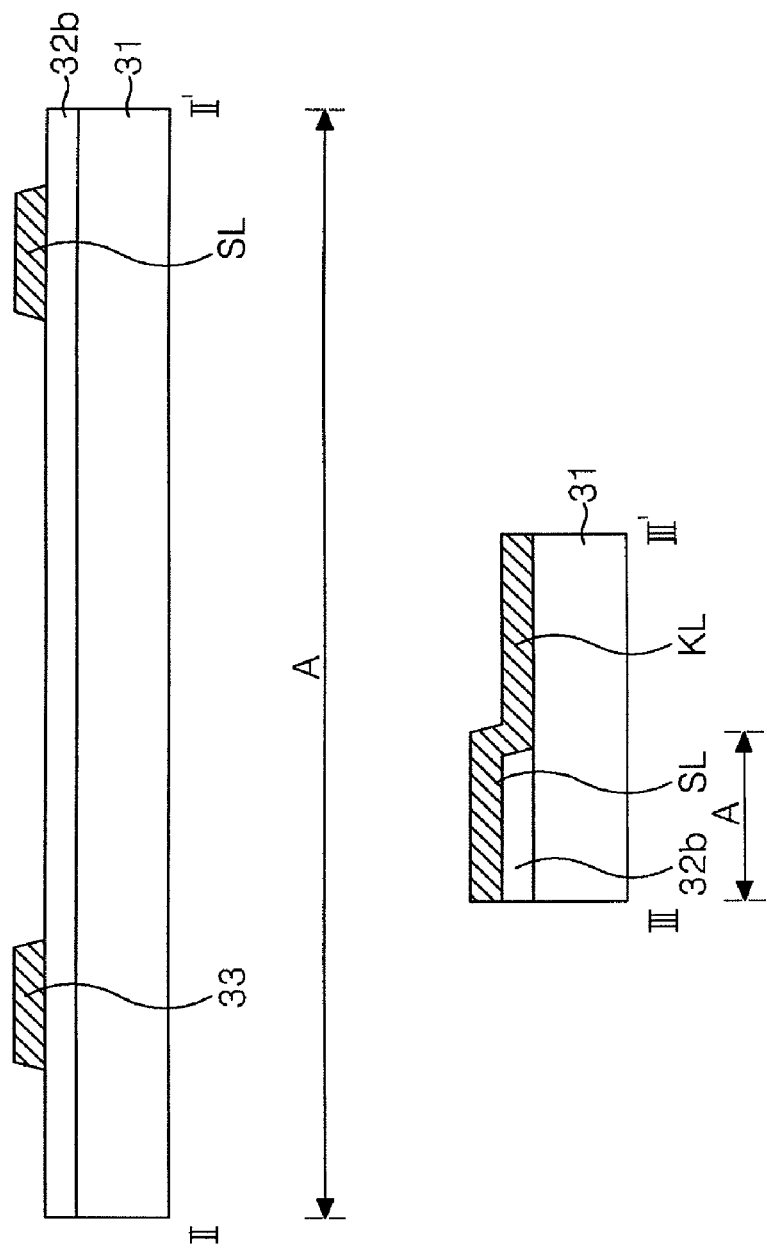

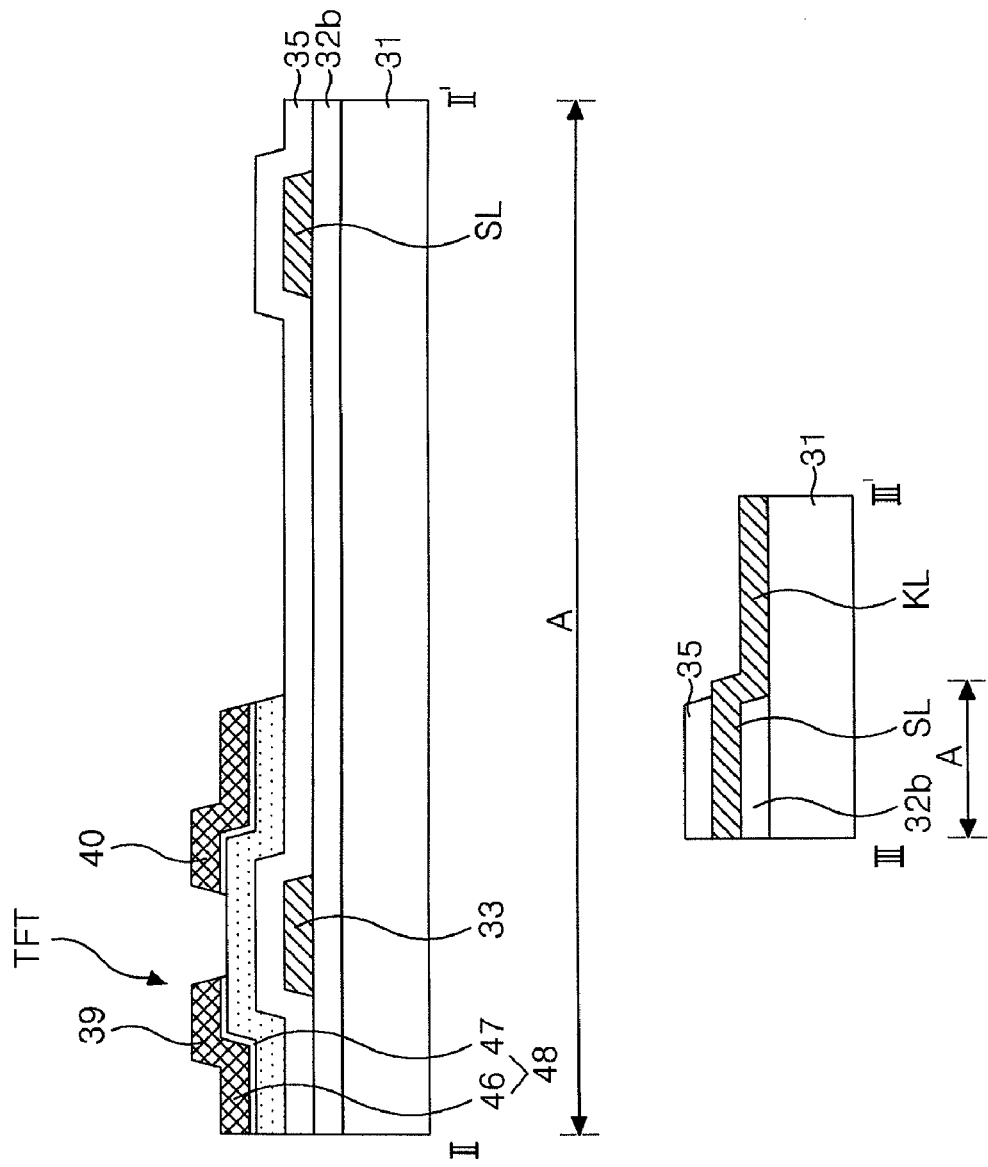

DISPLAY DEVICE AND METHOD WITH METAL SUBSTRATE INCLUDING A PIXEL ARRAY AND STORAGE CAPACITOR IN COMBINATION IN WHICH PLURAL STORAGE LINES CONNECTED THERETO ARE CONNECTED TO THE METAL SUBSTRATE

CLAIM FOR PRIORITY

This application claims the benefit of Korean Patent Application No. 2007-24612 filed Mar. 13, 2007, which is hereby incorporated by reference as if fully set forth herein.

BACKGROUND OF THE INVENTION

1. Field of the Invention

The present invention relates to a display device and a method of manufacturing the same, and more particularly, to a display device which prevents a parasitic capacitance caused by a metal substrate, and a method of manufacturing the same.

2. Discussion of the Related Art

In general, a thin film transistor (hereinafter, referred to as "TFT") is used for an active matrix type flat panel display. The active matrix type flat panel display includes a plurality of pixels defined by a plurality of gate and data lines crossing each other on a substrate. Each pixel is supplied with an electric signal by the TFT connected to the gate and data lines. Examples of the flat panel display including the TFT are liquid crystal display (LCD) device, organic light-emitting diode (OLED) and electrophoretic display.

FIG. 1 is a cross section diagram illustrating a TFT array substrate of a flat panel display according to the related art. Referring to FIG. 1, the TFT array substrate includes a plurality of pixels formed on a substrate 1. Each pixel is defined by gate and data lines (not shown) crossing each other, wherein each pixel includes a thin film transistor TFT, a pixel electrode 13 and a storage capacitor Cst. In response to a gate voltage from the gate line, the thin film transistor TFT makes the pixel electrode 13 charged with a data voltage from the data line. The data voltage charged in the pixel electrode 13 is maintained by the storage capacitor Cst.

The thin film transistor TFT includes a gate electrode 3 connected to the gate line; a source electrode 9 connected to the data line; a drain electrode 10 connected to the pixel electrode 13; and a semiconductor pattern 9 being ohmic contact with the source and drain electrodes 9 and 10. The semiconductor pattern 8 is comprised of an active layer 6 and an ohmic contact layer 7. The active layer 6 overlaps with the gate electrode 3 in state of interposing a gate insulation film 5 therebetween, wherein the active layer 6 is exposed between the source and drain electrodes 9 and 10, to thereby form a semiconductor channel. Also, the ohmic contact layer 7 overlaps between the source electrode 9 and the active layer 6, and between the drain electrode 10 and the active layer 6, so that the source and drain electrodes 9 and 10 are ohmic contact with the active layer 6. The thin film transistor TFT is protected by a protective film 11. The protective film 11 includes a contact hole 12 for exposing the drain electrode 10. Through the contact hole 12, the pixel electrode 13 is connected to the drain electrode 10.

The storage capacitor Cst is comprised of the pixel electrode 13 which overlaps with a storage line 4 in state of interposing the gate insulation film 5 and the protective film 11 therebetween.

As mentioned above, the substrate 1 for supporting the pixel array is generally made of glass. The glass has poor durability and has limitation in thinness. In this respect, the substrate of glass may cause limitation to thin profile of display device. Recently, the substrate is formed of metal which has good durability and is easy to realize the thin profile. The metal substrate 1 can realize a flexible display device which maintains a display function even in case of where the display device is bent. Also, since the metal substrate 1 is a conductor, a substrate insulation film 2 is formed on an entire surface of the metal substrate 1, so that the metal substrate 1 is insulated from the pixel array. However, there are parasitic capacitances C1 and C2 generated between the metal substrate 1 and signal lines 3 and 4 on the substrate insulation film 2. The parasitic capacitances C1 and C2 may distort the data voltage.

SUMMARY

A display device comprises a metal substrate including a pixel array provided with a plurality of storage lines to supply a storage voltage, and a supplying line connected to the storage lines; and a voltage source, connected to the supplying line, for generating the storage voltage. The metal substrate is connected to any one of an output terminal of the voltage source, the supplying line and the storage lines.

The pixel array comprises a gate line separated from the storage line, and a gate electrode of thin film transistor connected to the gate line; a semiconductor pattern overlapping with the gate electrode in the area of thin film transistor; a data line crossing the gate line on the semiconductor pattern, a source electrode of thin film transistor connected to the data line, and a drain electrode of thin film transistor; and a pixel electrode overlapping with the storage line and connected to the drain electrode of thin film transistor.

In another aspect, a display device comprises a first insulation film on a metal substrate; a first contact hole passing through the first insulation film, to expose the metal substrate; and a storage line connected to the metal substrate by the first contact hole, and formed on the first insulation film.

In another aspect, a display device comprises a first insulation film on a pixel array area of metal substrate except the edge of metal substrate; a supplying line supplied with a storage voltage and formed in the edge of metal substrate outside the pixel array area; and a plurality of storage lines, connected to the supplying line and formed on the first insulation film, for supplying the storage voltage to the pixel array area.

In another aspect, a display device comprises a metal substrate including a pixel array supplied with a storage voltage; a voltage source for generating the storage voltage; and a conductive cable connected to the metal substrate and an output terminal of the voltage source.

In another aspect, a method of manufacturing a display device comprises forming a pixel array including a supplying line to supply a storage voltage and a plurality of storage lines connected to the supplying line on a metal substrate; and connecting an output terminal of voltage source for generating the storage voltage to the supplying line, wherein the metal substrate is connected to any one of the supplying line, the storage lines, and the output terminal of voltage source.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7B is a cross section diagram illustrating the third mask process therein;

FIG. 8B is a cross section diagram illustrating the fourth mask process therein;

FIG. 9B is a cross section diagram illustrating the fifth mask process therein;

FIG. 12B is a cross section diagram illustrating the first mask process therein;

FIG. 13B is a cross section diagram illustrating the second mask process therein;

DETAILED DESCRIPTION OF THE DISCLOSURE

Reference will now be made in detail to the preferred embodiments of the present invention, examples of which are illustrated in the accompanying drawings. Wherever possible, the same reference numbers will be used throughout the drawings to refer to the same or like parts.

Hereinafter, a display device according to the present invention and a method of manufacturing the same will be explained with reference to FIGS. 2 to 16C.

Figure 1:
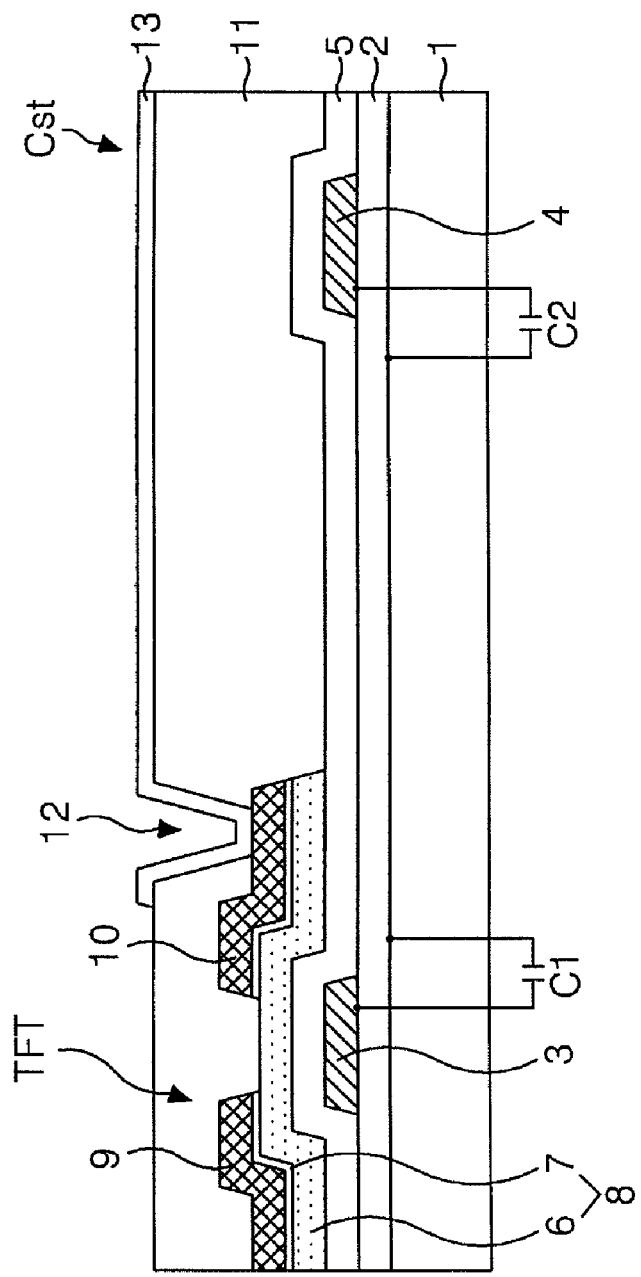
FIG. 1 is a cross section diagram illustrating a TFT array substrate in a related art display device.
Figure 2:
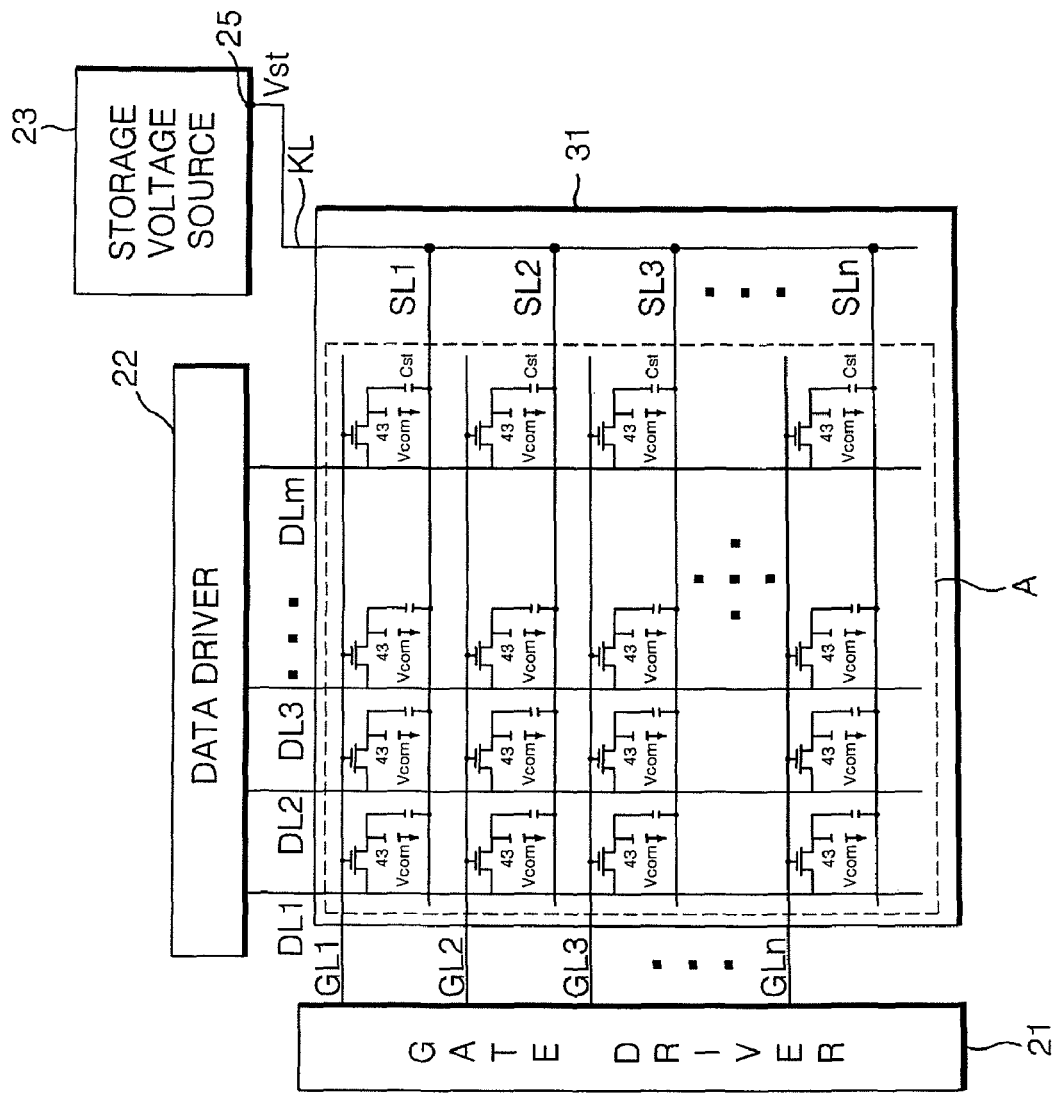
FIG. 2 is a schematic diagram illustrating a display device according to the present disclosure.

FIG. 2 is a schematic diagram illustrating a display device according to the present disclosure.

Referring to FIG. 2, the display device according to the present invention includes a TFT array substrate and a driver to apply a driving signal to the TFT array substrate. The TFT array substrate is formed of a pixel array comprising 'm×n' pixels arranged in a matrix configuration. The driver includes a gate driver 21, a data driver 22 and a storage voltage source 23. The pixels are formed in regions defined by 'm' data lines DL1 to DLm and 'n' gate lines GL1 to GLn, wherein each data line is orthogonal to each gate line. Also, the pixels are positioned in a pixel array area A except the edge of a metal substrate 31.

On the pixel array area A, there are a thin film transistor TFT connected to each pixel, a pixel electrode 43, and a storage capacitor Cst. The thin film transistor TFT responds to a gate voltage supplied to the gate line GL, and makes the corresponding pixel electrode 43 charged with a data voltage supplied to the data line DL. For this, the thin film transistor TFT is connected to the data line DL, the gate line GL and the pixel electrode 43. The data lines DL1 to DLm are connected to the data driver 22 of supplying the data voltage; and the gate lines GL1 to GLn are connected to the gate driver 21 of supplying the gate voltage.

If the thin film transistor TFT is turned-on by the gate voltage supplied to the gate line GL in sequence, the pixels are charged with the corresponding data voltage from the data line DL, and are maintained with the charging voltage until the thin film transistor TFT is turned-on again. The data voltage charged in the predetermined pixel is maintained by the storage capacitor Cst formed by the overlap of the pixel electrode 43 and a storage line SL.

The storage lines SL1 to SLn are connected to a supplying line KL formed outside the pixel array area A, that is, the edge of metal substrate 31. The supplying line KL supplies a storage voltage Vst generated in the storage voltage source 23 to the storage lines SL1 to SLn, to thereby maintain the data voltage. The storage voltage Vst generated in the storage voltage source 23 is supplied to the supplying line KL through a cable connected to the supplying line KL and an output terminal 25. At this time, the storage voltage Vst is supplied with a common voltage Vcom or other voltages being different from the common voltage Vcom.

The common voltage Vcom is supplied to a common electrode which is positioned in opposite to the pixel electrode 43. The common electrode is formed on an upper substrate in a vertical electric field driving method, for example, Twisted Nematic TN or Vertical Alignment VA mode. Meanwhile, in case of a horizontal electric field driving method, for example, In-Plane Switching IPS or Fringe Filed Switching FFS mode, the common electrode as well as the pixel electrode 43 is formed on a lower substrate.

In the display device according to the present disclosure, any one of the storage voltage source 23, the storage lines SL1 to SLn and the supplying line KL is connected to the metal substrate 31. Accordingly, the metal substrate 31 is used as an electrode of the storage capacitor Cst, so that it is possible to prevent parasitic capacitance caused by the metal substrate 31. Hereinafter, a method of using the metal substrate 31 as the electrode of the storage capacitor Cst will be explained with the detailed embodiments as follows.

Figure 3:
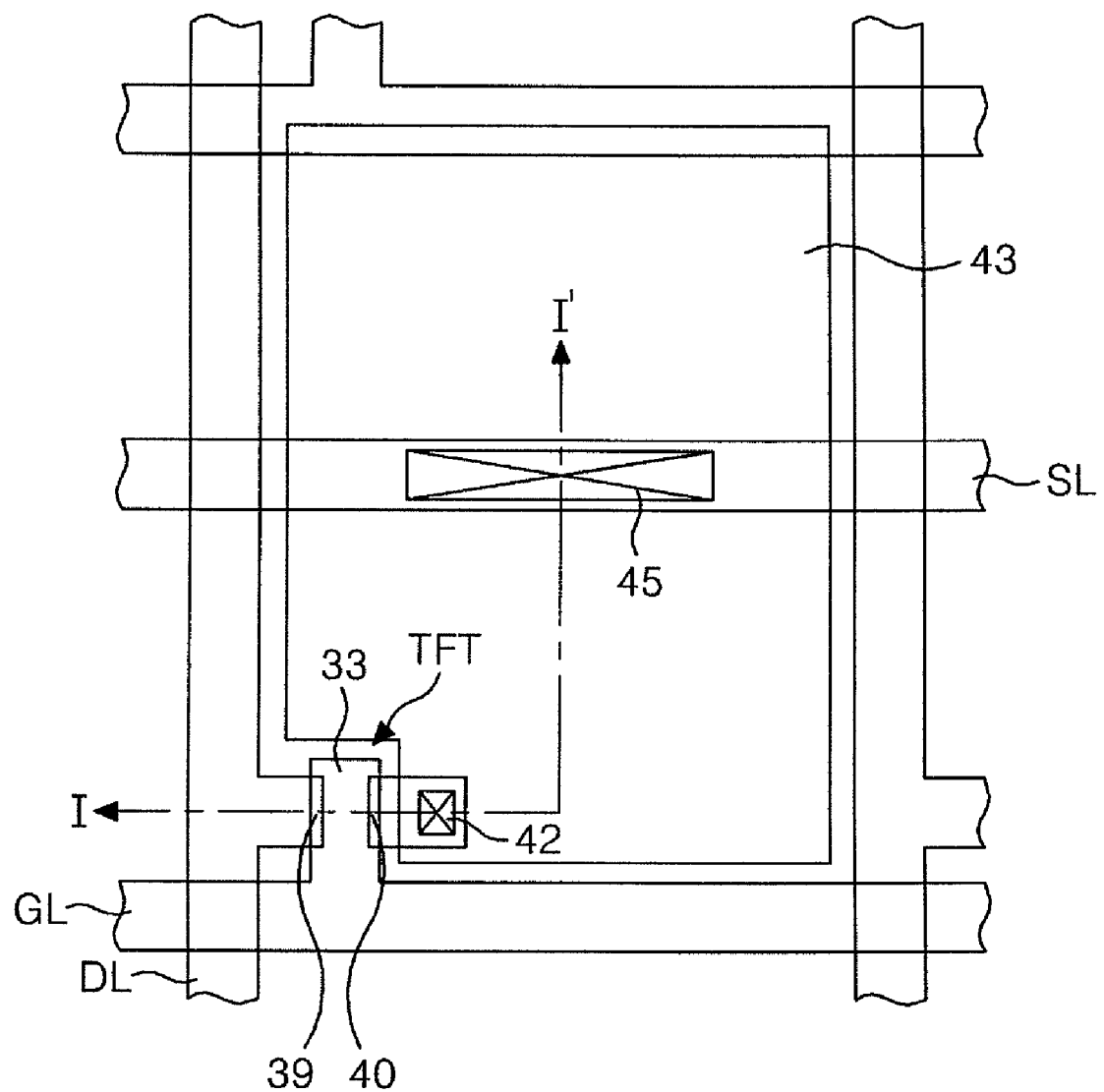
FIG. 3 is a plan diagram illustrating a TFT array substrate in a display device according to the first embodiment of the present disclosure.
Figure 4:
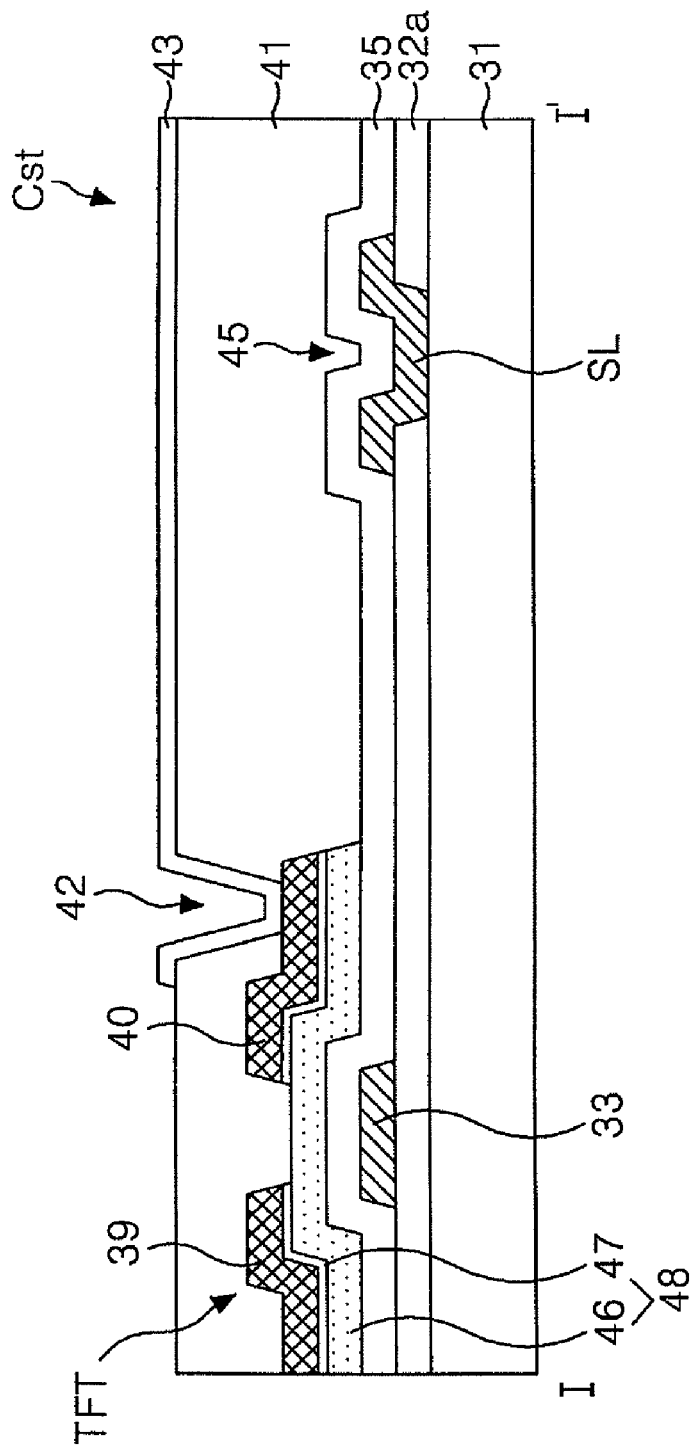
FIG. 4 is a cross section diagram illustrating a TFT array substrate along I-I' of FIG. 3.

FIG. 3 is a plan diagram illustrating a TFT array substrate in a display device according to the first embodiment of the present disclosure. FIG. 4 is a cross section diagram illustrating a TFT array substrate along I-I' of FIG. 3.

Referring to FIGS. 3 and 4, the TFT array substrate according to the first embodiment of the present invention includes a storage line SL connected to a metal substrate 31.

The metal substrate 31 used for the TFT array substrate according to the first embodiment of the present disclosure is covered with a first insulation film 32a to insulate the metal substrate 31. The first insulation film 32a includes a first contact hole 45 to expose the metal substrate 31. On the first insulation film 32a, there is a pixel array according to the first embodiment of the present disclosure.

As shown in FIG. 2, the pixel array includes a plurality of pixels defined by crossing a gate line GL and a data line DL, wherein each pixel is connected to a thin film transistor TFT, a pixel electrode 43 and a storage capacitor Cst. The storage capacitor Cst is comprised of the pixel electrode 43 which overlaps with the storage line SL in state of interposing an insulation film 35, 41 therebetween. The storage line SL according to the first embodiment of the present disclosure is formed on the first insulation film 32a, and is connected to the metal substrate 31 by the first contact hole 45. Also, the storage line SL is separated from the gate line formed on the first insulation film 32a, wherein the storage line SL and the gate line GL are formed of the same metal material.

The gate line GL 2 crosses the data line DL in state of interposing a second insulation film 35 therebetween. Then, the thin film transistor TFT is formed at each crossing of the gate line GL and the data line DL. The thin film transistor TFT includes a gate electrode 33 connected to the gate line GL; a source electrode 39 connected to the data line DL; a drain electrode 40 connected to the pixel electrode 43; and a semiconductor pattern 48 being ohmic-contact with the source and drain electrode 39 and 40.

The semiconductor pattern 48 is comprised of an active layer 46 and an ohmic contact layer 47. The active layer 4 overlaps with the gate electrode 33 in state of interposing the second insulation film therebetween, wherein the active layer 4 is exposed between the source and drain electrodes 39 and 40, to thereby form a semiconductor channel. The ohmic contact layer 47 overlaps between the source electrode 39 and the active layer 46, and between the drain electrode 40 and the active layer 46, so that the source and drain electrodes 39 and 40 are ohmic-contact with the active layer 46. The thin film transistor TFT is protected by a third insulation film 41. The third insulation film 41 includes a second contact hole 42 for exposing the drain electrode 40. Through the second contact hole 42, the pixel electrode 43 is connected to the drain electrode 40.

The display device according to the first embodiment of the present disclosure includes the first contact hole 45 passing through the first insulation film 32a on the metal substrate 31 so as to expose the metal substrate 31. Through the first contact hole 45, the storage line SL is brought into contact with the metal substrate 31. According as the first contact hole 45 is formed in at least any one of the pixels included in the pixel array, it is possible to prevent the parasitic capacitance caused by the metal substrate 31.

Hereinafter, a method of manufacturing the TFT array substrate according to the first embodiment of the present disclosure will be explained as follows.

Figure 5A:
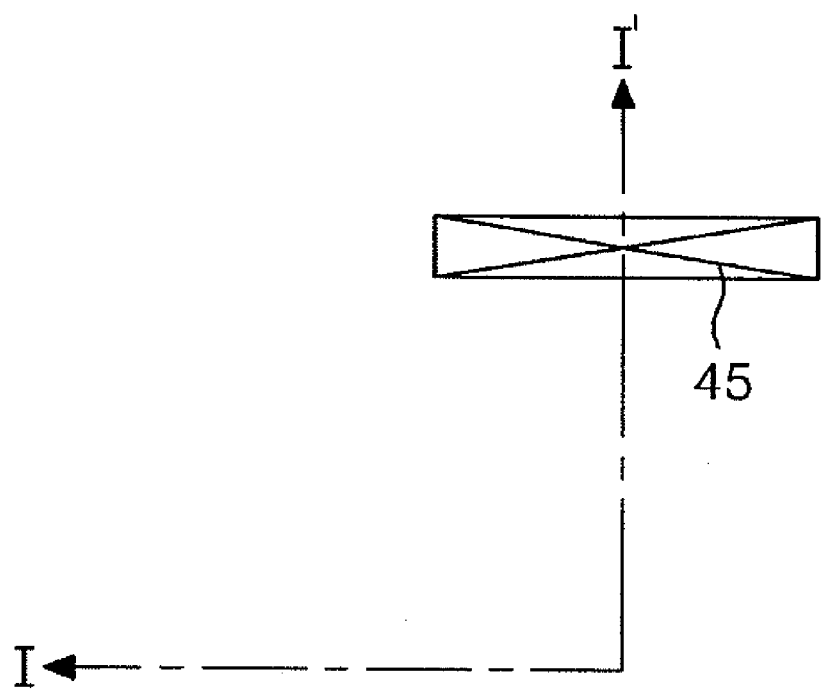
FIG. 5A is a plan diagram illustrating a first mask process in a method of manufacturing a TFT array substrate according to the first embodiment of the present invention.
Figure 5B:
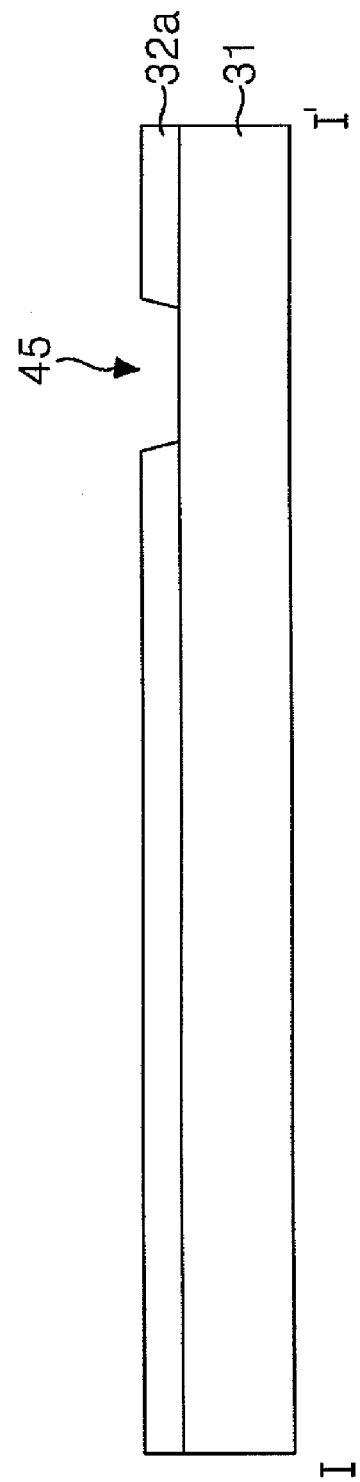
FIG. 5B is a cross section diagram illustrating the first mask process therein.

FIG. 5A is a plan diagram illustrating a first mask process in a method of manufacturing a TFT array substrate according to the first embodiment of the present disclosure, and FIG. 5B is a cross section diagram illustrating the first mask process therein. As shown in FIGS. 5A and 5B, the first insulation film 32a including the first contact hole 45 is formed on the metal substrate 31 by the first mask process. The first insulation film 32a may be formed of an inorganic insulation material of SiOx or SiNx, or may be formed of an organic insulation material of acrylic organic compound, benzocyclobutene BCB, perfluorocyclobutane PFBC, Teflon or cytop.

Figure 6A:
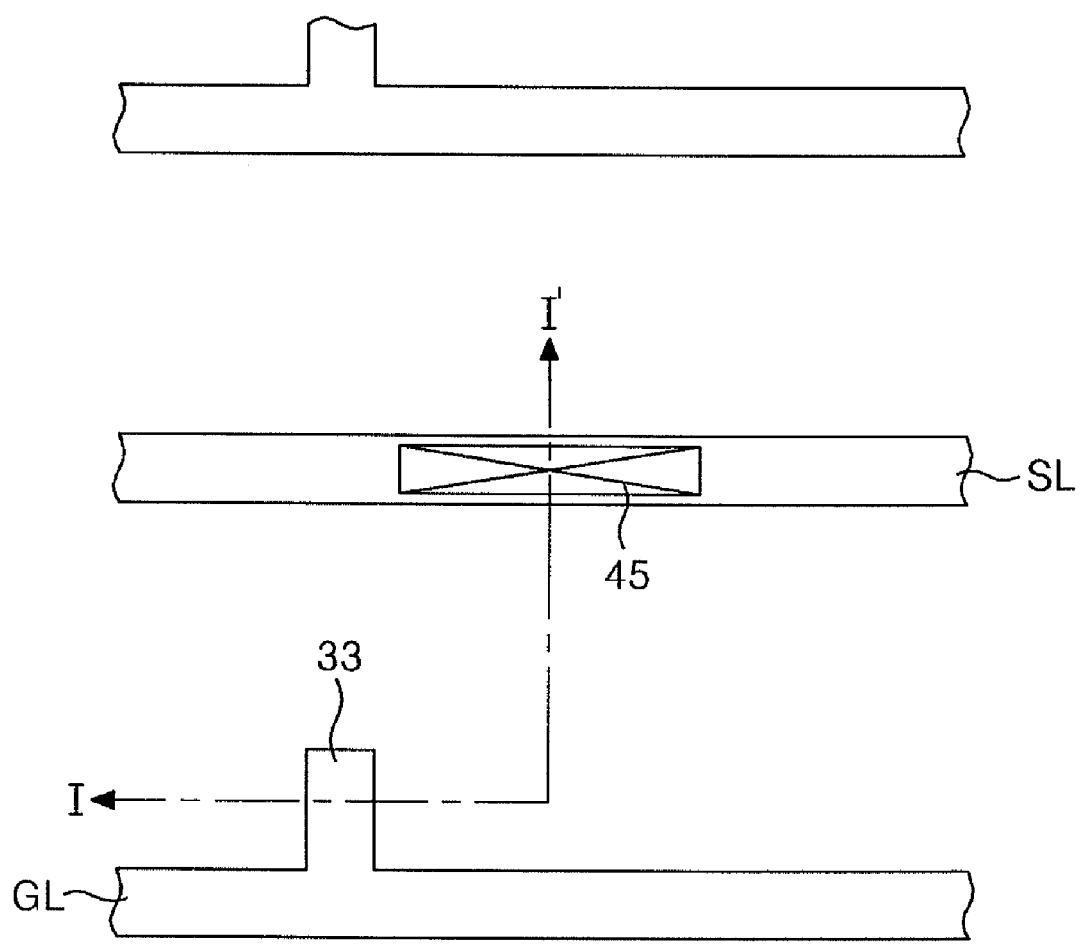
FIG. 6A is a plan diagram illustrating a second mask process in a method of manufacturing a TFT array substrate according to the first embodiment of the present disclosure.
Figure 6B:
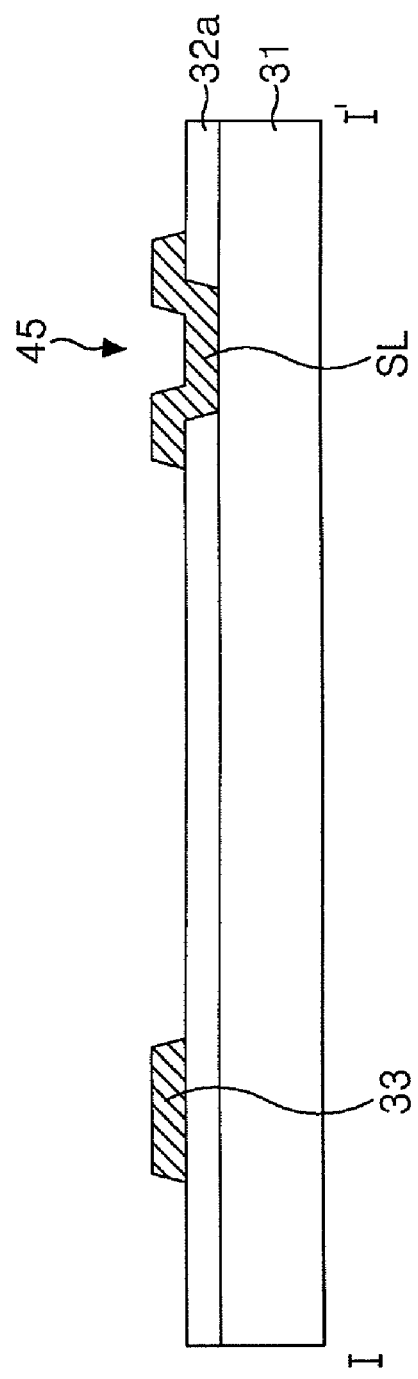
FIG. 6B is a cross section diagram illustrating the second mask process therein.

FIG. 6A is a plan diagram illustrating a second mask process in a method of manufacturing a TFT array substrate according to the first embodiment of the present disclosure, and FIG. 6B is a cross section diagram illustrating the second mask process therein. As shown in FIGS. 6A and 6B, the second mask process is performed to form a gate conductive pattern group, which includes the gate line GL, the gate electrode 33 connected to the gate line GL, and the storage line SL separated from the gate line GL and connected to the metal substrate 31 through the first contact hole 45. The gate conductive pattern group is formed of a single layer or double layer of Mo, Ti, Cu, AlNd, Al, Cr, Mo ally, Cu ally or Al alloy.

Figure 7A:
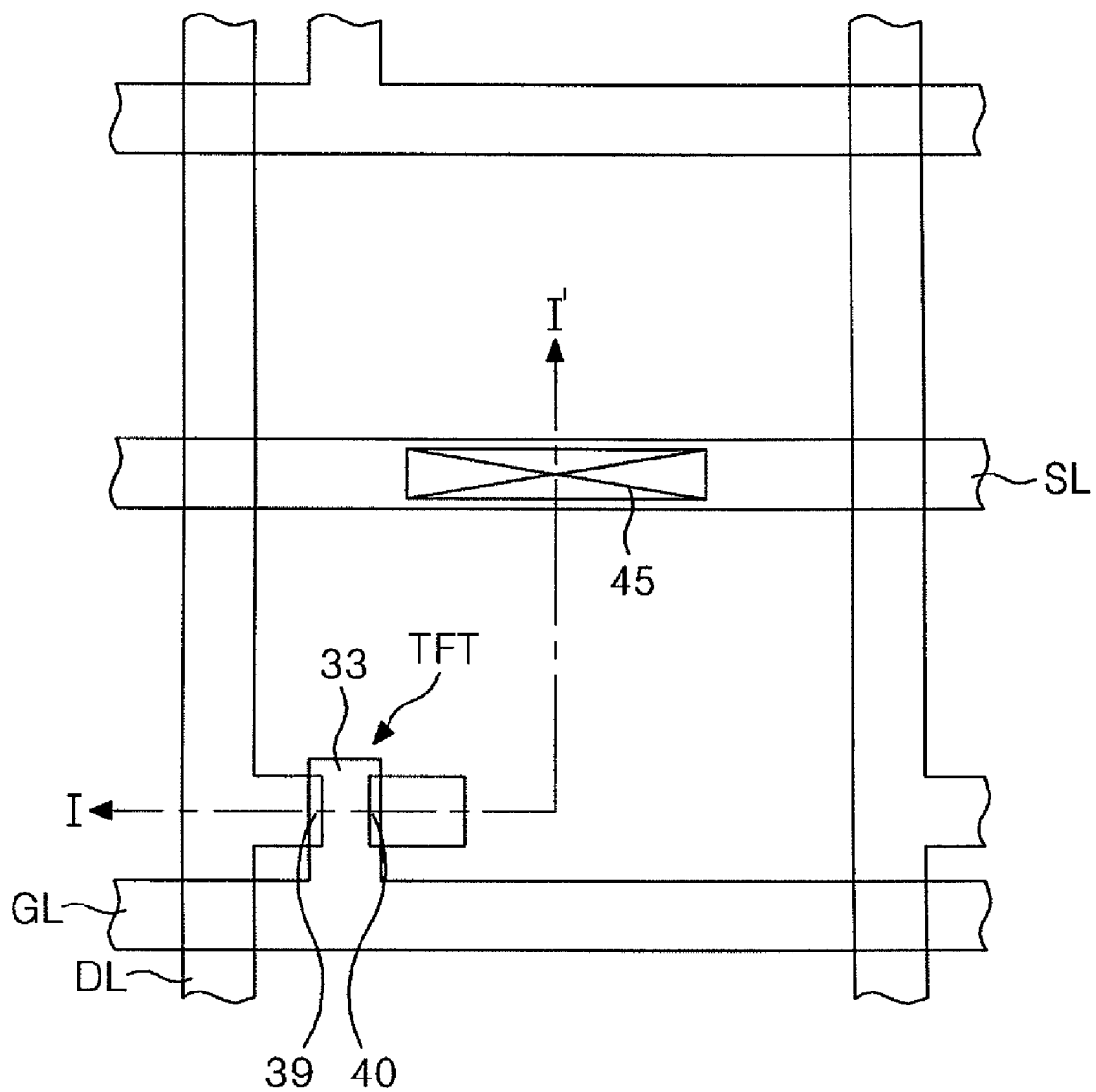
FIG. 7A is a plan diagram illustrating a third mask process in a method of manufacturing a TFT array substrate according to the first embodiment of the present invention.

FIG. 7A is a plan diagram illustrating a third mask process in a method of manufacturing a TFT array substrate according to the first embodiment of the present disclosure, and FIG. 7B is a cross section diagram illustrating the third mask process therein. As shown in FIGS. 7A and 7B, after forming the second insulation film 35 to cover the gate conductive pattern group, the third mask process is performed to form the semiconductor pattern 48 including the active layer 46 and the ohmic contact layer 47; and a source/drain conductive pattern group including the data line DL, the source electrode 39 connected to the data line DL, and the drain electrode 40 positioned at a predetermined interval from the source electrode 39. The second insulation film 35 is formed of an inorganic insulation material of SiOx or SiNx. The active layer 46 is formed of amorphous silicon; and the ohmic contact layer 47 is formed of amorphous silicon doped with $n^+$ or $p^+$ impurity ions. The source/drain metal may be formed of a single or double layer of Mo, Ti, Cu, AlNd, Al, Cr, Mo alloy, Cu alloy or Al alloy. The third mask process uses a half-tone mask or a diffraction exposure mask, which can form the semiconductor pattern 48 and the source/drain conductive pattern group by one mask process.

Figure 8A:
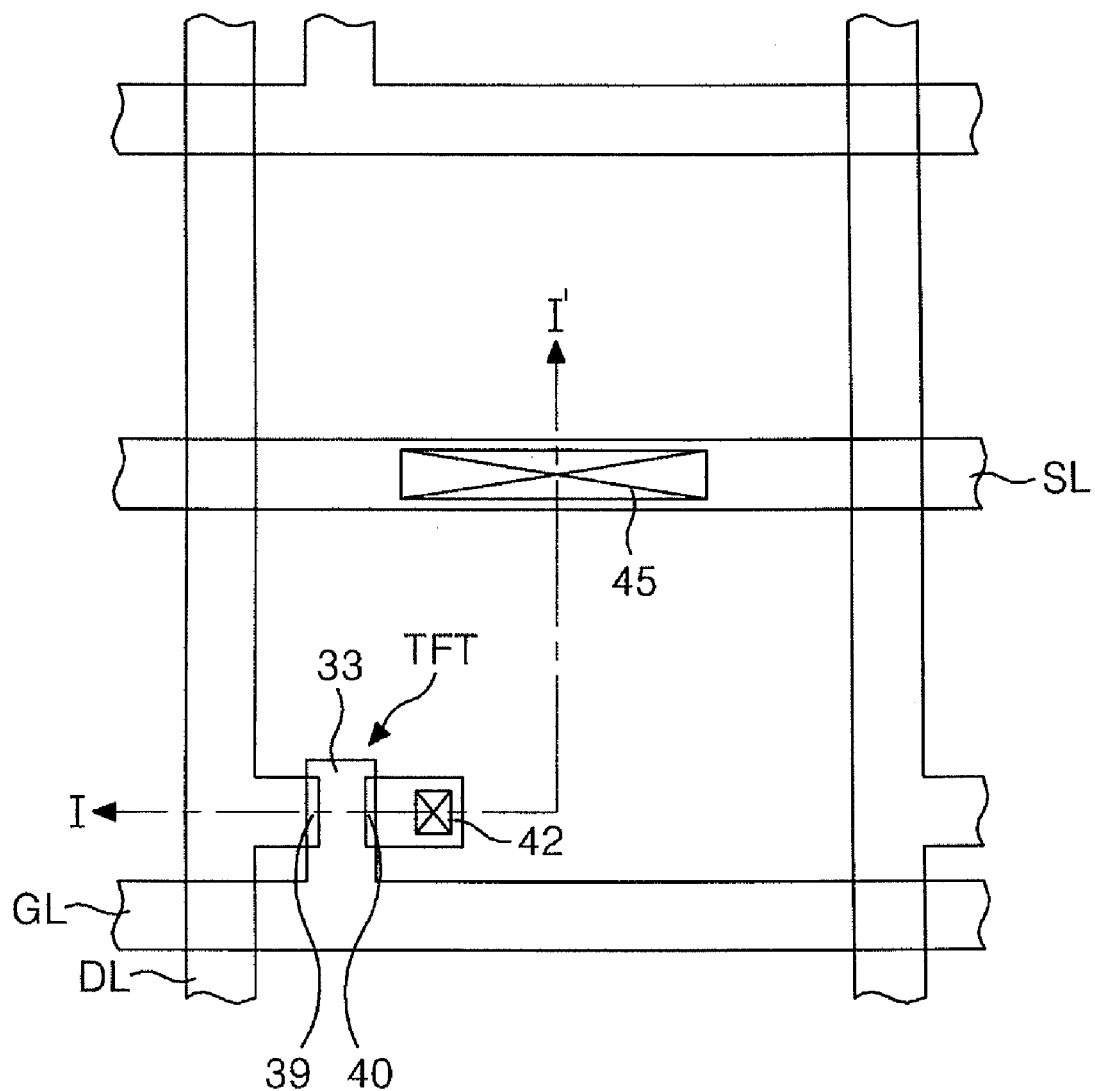
FIG. 8A is a plan diagram illustrating a fourth mask process in a method of manufacturing a TFT array substrate according to the first embodiment of the present disclosure.

FIG. 8A is a plan diagram illustrating a fourth mask process in a method of manufacturing a TFT array substrate according to the first embodiment of the present disclosure, and FIG. 8B is a cross section diagram illustrating the fourth mask process therein. As shown in FIGS. 8A and 8B, the fourth mask process is performed to form the third insulation film 41 which is formed on the second insulation film 35 to cover the semiconductor pattern 48 and the source/drain pattern, wherein the third insulation film 41 includes the second contact hole 42 to expose the drain electrode 40. The third insulation film 41 may be formed of an inorganic insulation material of SiOx or SiNx, or may be formed of an organic insulation material of acrylic organic compound, benzocyclobutene BCB, perfluorocyclobutane PFBC, Teflon or cytop.

Figure 9A:
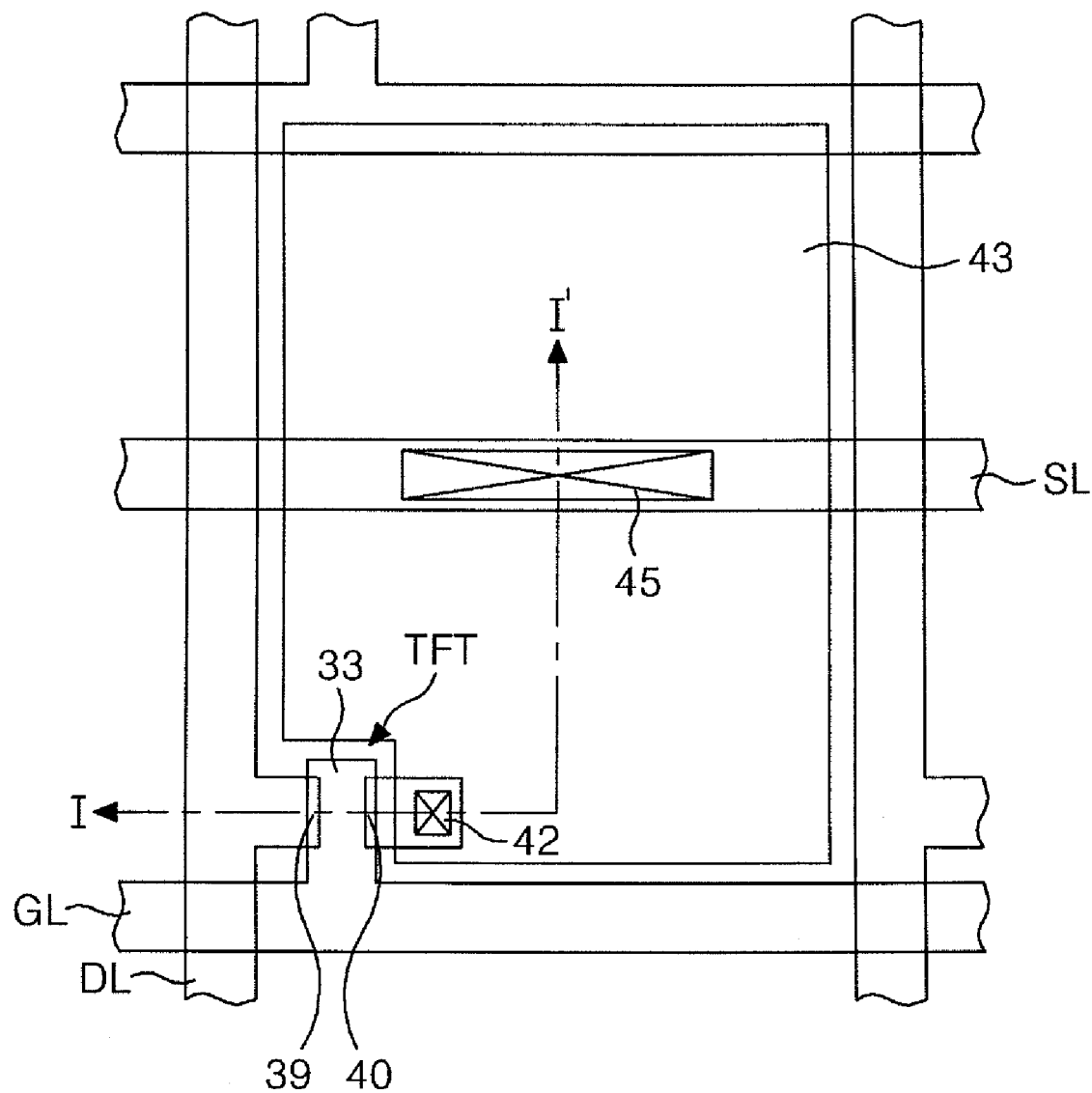
FIG. 9A is a plan diagram illustrating a fifth mask process in a method of manufacturing a TFT array substrate according to the first embodiment of the present disclosure.

FIG. 9A is a plan diagram illustrating a fifth mask process in a method of manufacturing a TFT array substrate according to the first embodiment of the present disclosure, and FIG. 9B is a cross section diagram illustrating the fifth mask process therein. As shown in FIGS. 9A and 9B, the fifth mask process is performed to form the pixel electrode 43 which is connected to the drain electrode 40 through the second contact hole 42. The pixel electrode 43 is formed of a transparent conductive metal material, for example, indium tin oxide ITO, tin oxide TO, indium zinc oxide IZO, or indium tin zinc oxide ITZO. In addition to the transparent conductive metal material, the pixel electrode 43 may be formed of a typical metal material of Al, AlNd or Mo.

Figure 10:
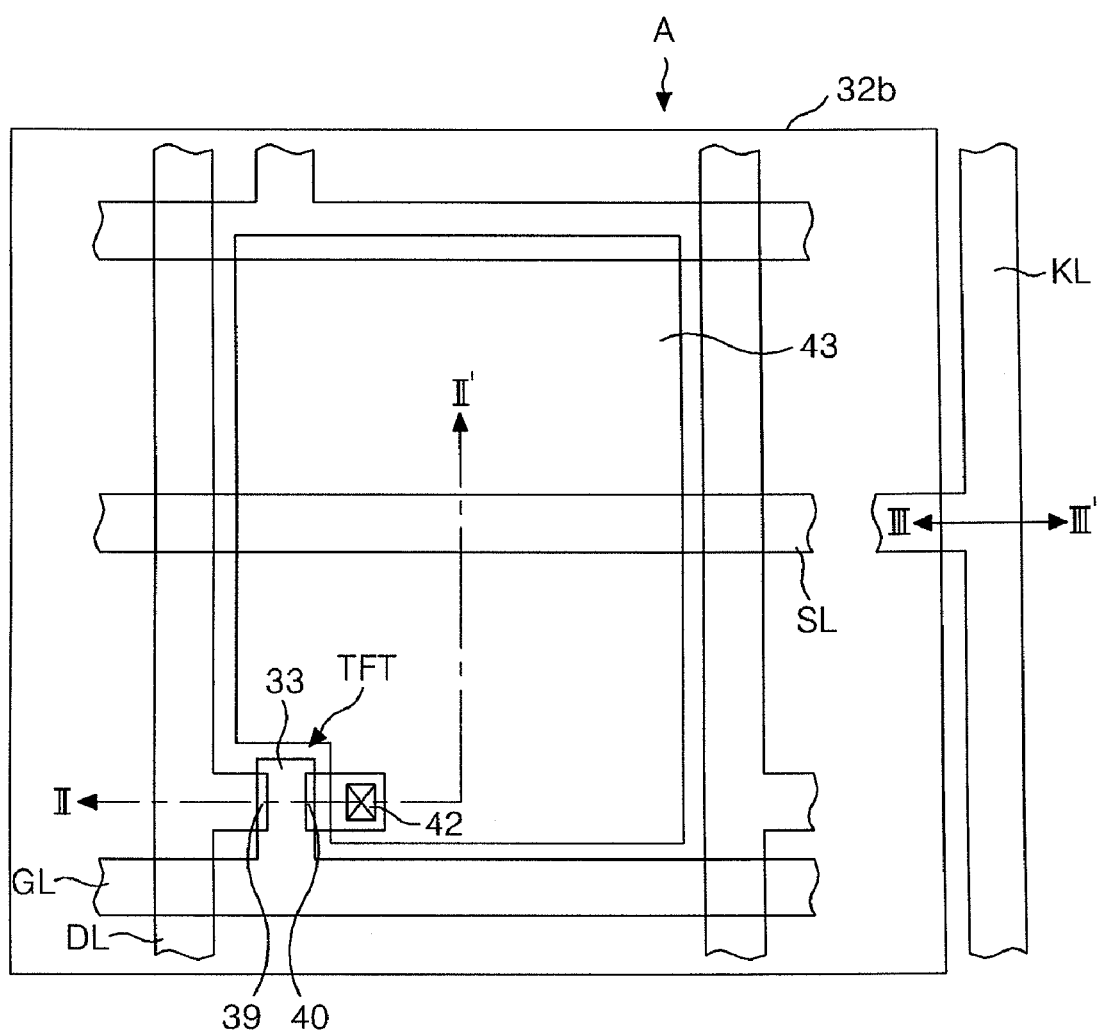
FIG. 10 is a plan diagram illustrating a TFT array substrate in a display device according to the second embodiment of the present disclosure.
Figure 11:
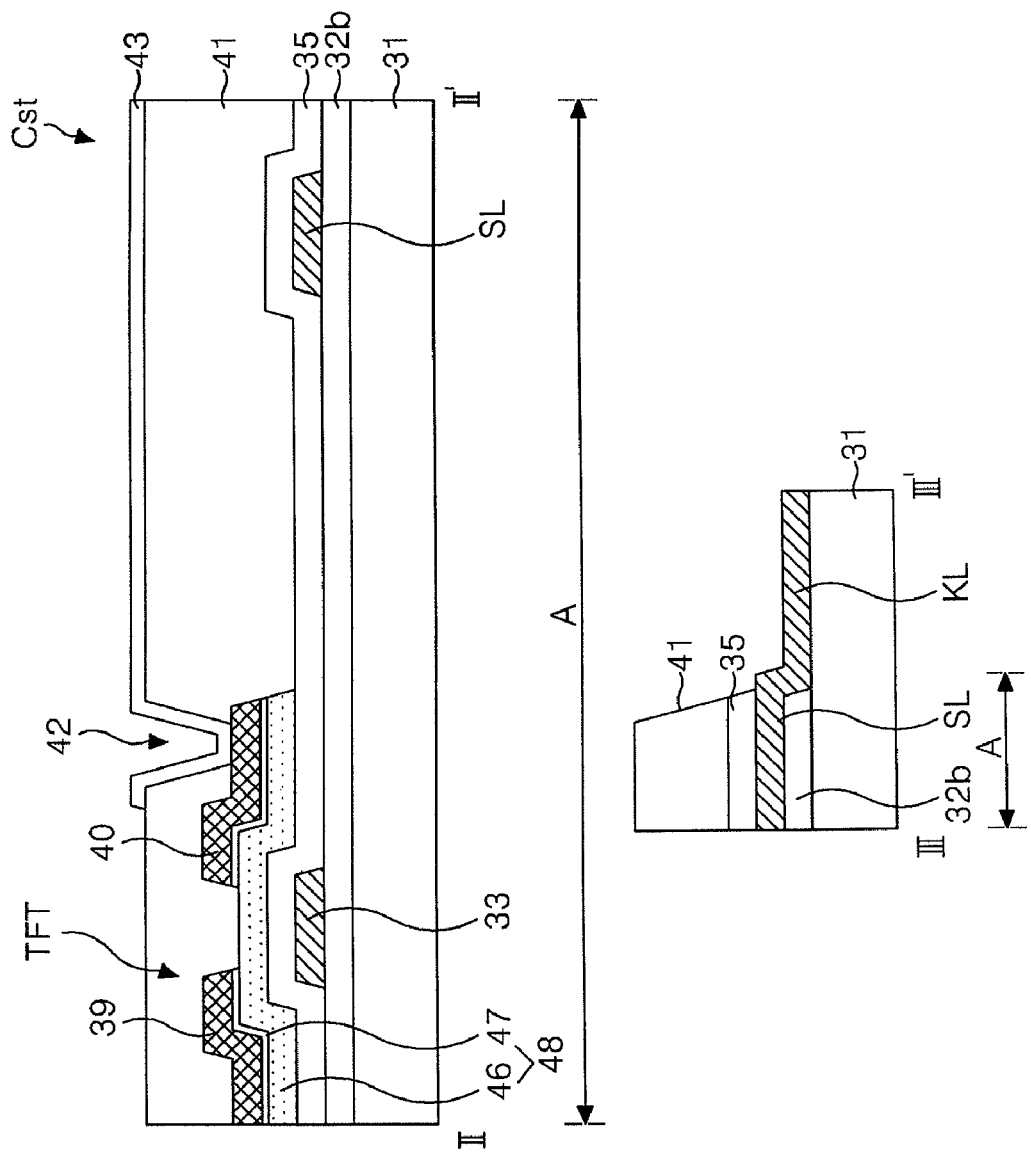
FIG. 11 is a cross section diagram illustrating a TFT array substrate along II-II' and III-III' of FIG. 10.

FIG. 10 is a plan diagram illustrating a TFT array substrate in a display device according to the second embodiment of the present disclosure. FIG. 11 is a cross section diagram illustrating a TFT array substrate along II-II' and III-III' of FIG. 10.

Referring to FIGS. 10 and 11, the TFT array substrate according to the second embodiment of the present invention includes a supplying line KL connected to a metal substrate 31.

In the TFT array substrate according to the second embodiment of the present invention, a first insulation film 32b is formed on a pixel array area A except the edge of metal substrate 31, wherein the first insulation film 32b is provided to insulate the metal substrate 31. As explained with reference to FIG. 2, the pixel array area A is provided with a plurality of pixels, each pixel defined with a gate line GL and a data line DL crossing each other. Each pixel is connected to a thin film transistor TFT, a pixel electrode 43 and a storage capacitor Cst.

The storage capacitor Cst is comprised of the pixel electrode 43 which overlaps with the storage line SL in state of interposing an insulation film 35, 41 therebetween. The storage line SL according to the second embodiment of the present disclosure is formed on the first insulation film 32b. Also, the storage line SL is positioned at a predetermined interval from the gate line GL on the first insulation film 32b, wherein the storage line SL and the gate line GL are formed of the same metal material. The storage line SL is connected to the supplying line KL of supplying the storage voltage, wherein the supplying line KL is formed in the edge of metal substrate 31 outside the pixel array area A. The supplying line KL is directly formed on the metal substrate 31, so that the supplying line KL is directly connected to the metal substrate 31.

The gate line GL 2 crosses the data line DL in state of interposing a second insulation film 35 therebetween. At each crossing of the gate and data lines GL and DL, there is a thin film transistor TFT, as shown in FIGS. 3 and 4.

As mentioned above, the display device according to the second embodiment of the present disclosure includes the first insulation film 32b formed only in the pixel array area; and the supplying line KL directly formed on the metal substrate 31 outside the pixel array area. Accordingly, the supplying line KL is brought into contact with to the metal substrate 31. The supplying line KL prevents the parasitic capacitance caused by the metal substrate 31. The first insulation film 32b according to the second embodiment of the present invention is formed in the pixel array area A except the edge of the metal substrate 31 provided with the supplying line KL, whereby the metal substrate 31 is directly connected to the supplying line KL. Thus, it is unnecessary to form a contact hole passing through the first insulation film 32b by an additional mask process. The TFT array substrate according to the second embodiment of the present invention can be fabricated with the simplified process.

Hereinafter, a method of manufacturing the TFT array substrate according to the second embodiment of the present invention will be explained as follows.

Figure 12A:
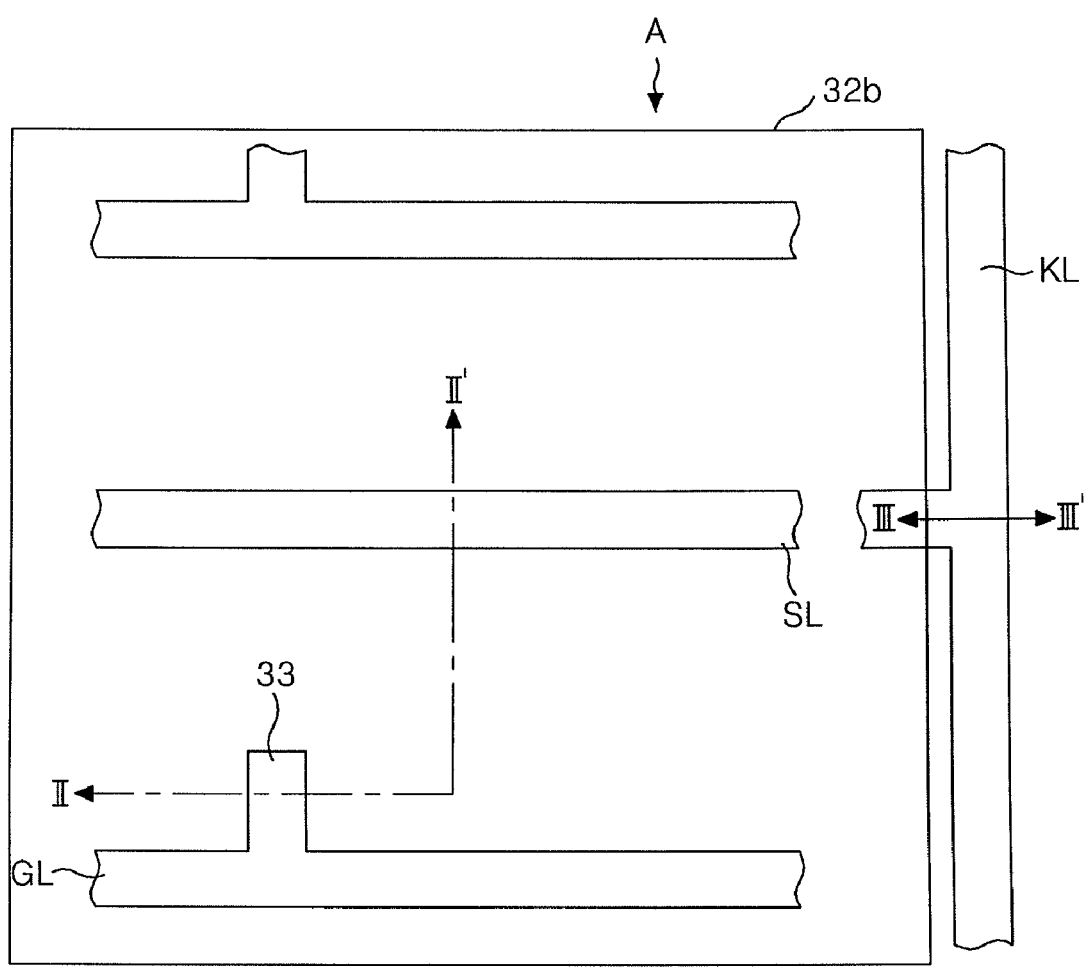
FIG. 12A is a plan diagram illustrating a first mask process in a method of manufacturing a TFT array substrate according to the second embodiment of the present disclosure.

FIG. 12A is a plan diagram illustrating a first mask process in a method of manufacturing a TFT array substrate according to the second embodiment of the present disclosure, and FIG. 12B is a cross section diagram illustrating the first mask process therein. As shown in FIGS. 12A and 12B, after forming the first insulation film 32b in the pixel array area A of the metal substrate 31, the first mask process is performed to form a gate conductive pattern group including the gate line GL, a gate electrode 33 connected to the gate line GL, the storage line SL separated from the gate line GL, and the supplying line KL connected to the storage line SL. At this time, the gate line GL, the gate electrode 33 connected to the gate line GL, and the storage line SL are formed on the first insulation film 32b of the pixel array area A. The supplying line KL is formed on the metal substrate 31 outside the pixel array area A. The first insulation film 32b may be formed of an inorganic insulation material of SiOx or SiNx, or may be formed of an organic insulation material of acrylic organic compound, enzocyclobutene BCB, perfluorocyclobutane PFBC, Teflon or cytop. Also, the gate conductive pattern group is formed of a single layer or double layer of Mo, Ti, Cu, AlNd, Al, Cr, Mo ally, Cu ally or Al alloy.

The first insulation film 32b may be formed by chemical vapor deposition CVD or coating. For example, the first insulation film 32b of inorganic insulation material is formed by CVD, and the first insulation film 32b of organic insulation material is formed by coating. If using the CVD, the first insulation film 32b is deposited on the metal substrate 31 in state of fixing the edge of metal substrate 31 by a clamp. Accordingly, it is impossible to deposit the inorganic insulation material on the edge of metal substrate 31 since the clamp covers the edge of metal substrate 31. If using the coating, the organic insulation material is removed from the edge of metal substrate 31 by an edge remove ER process for cleaning the edge of metal substrate 31 after coating the entire surface of metal substrate 31 with the first insulation film 32b. In the gate conductive pattern group, the supplying line KL is formed in the edge of metal substrate 31 on which the first insulation film 32b is not formed, whereby the supplying line KL is directly connected to the metal substrate 31.

Figure 13A:
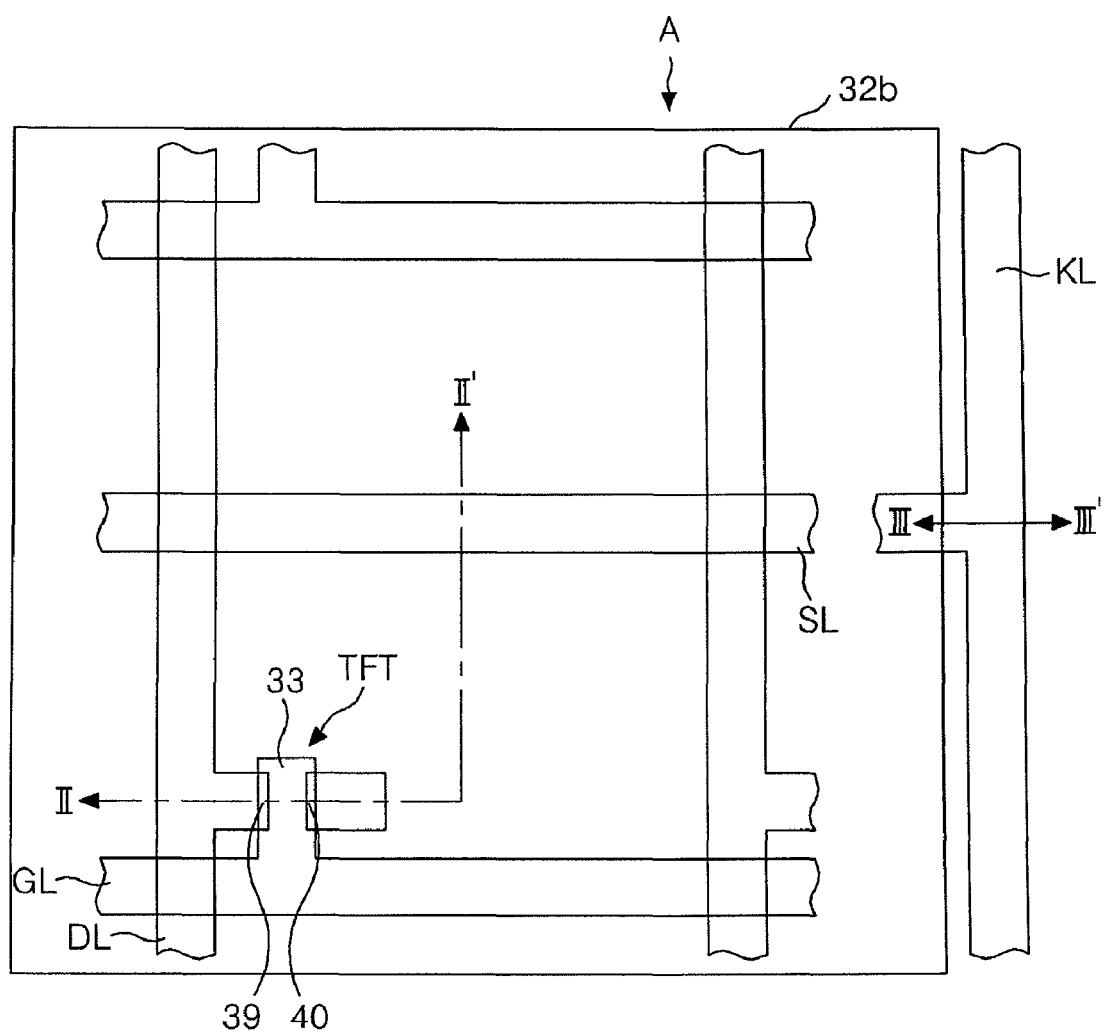
FIG. 13A is a plan diagram illustrating a second mask process in a method of manufacturing a TFT array substrate according to the second embodiment of the present disclosure.

FIG. 13A is a plan diagram illustrating a second mask process in a method of manufacturing a TFT array substrate according to the second embodiment of the present disclosure, and FIG. 13B is a cross section diagram illustrating the second mask process therein. As shown in FIGS. 13A and 13B, after forming the second insulation film 35 to cover the gate conductive pattern group, the second mask process is performed to form the semiconductor pattern 48 including the active layer 46 and the ohmic contact layer 47; and a source/drain conductive pattern group including the data line DL, the source electrode 39 connected to the data line DL, and the drain electrode 40 positioned at a predetermined interval from the source electrode 39. The second insulation film 35 is formed of an inorganic insulation material of SiOx or SiNx. The active layer 46 is formed of amorphous silicon; and the ohmic contact layer 47 is formed of amorphous silicon doped with $n^+$ or $p^+$ impurity ions. The source/drain metal may be formed of a single or double layer of Mo, Ti, Cu, AlNd, Al, Cr, Mo alloy, Cu alloy or Al alloy. The second mask process uses a half-tone mask or a diffraction exposure mask, which can form the semiconductor pattern 48 and the source/drain conductive pattern group by one mask process.

Figure 14A:
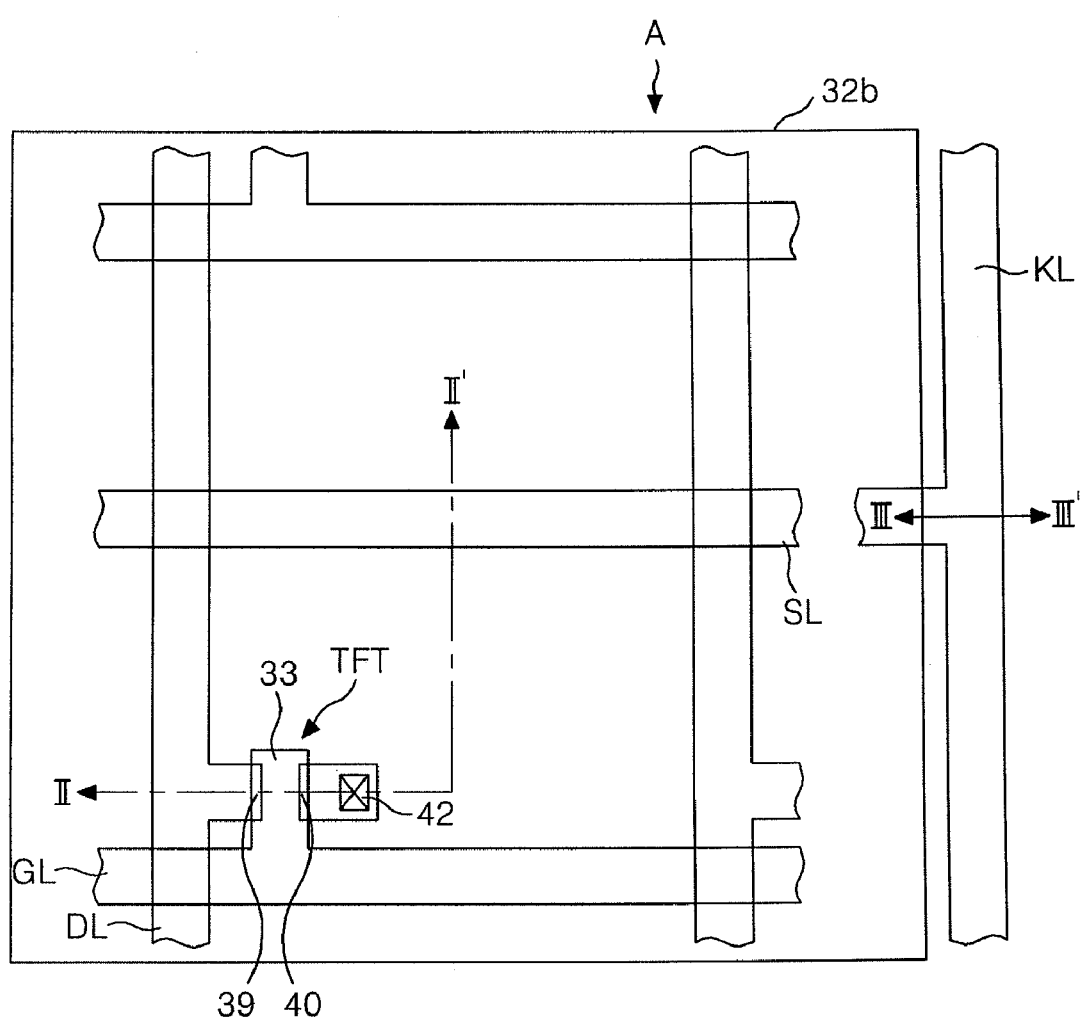
FIG. 14A is a plan diagram illustrating a third mask process in a method of manufacturing a TFT array substrate according to the second embodiment of the present disclosure.
Figure 14B:
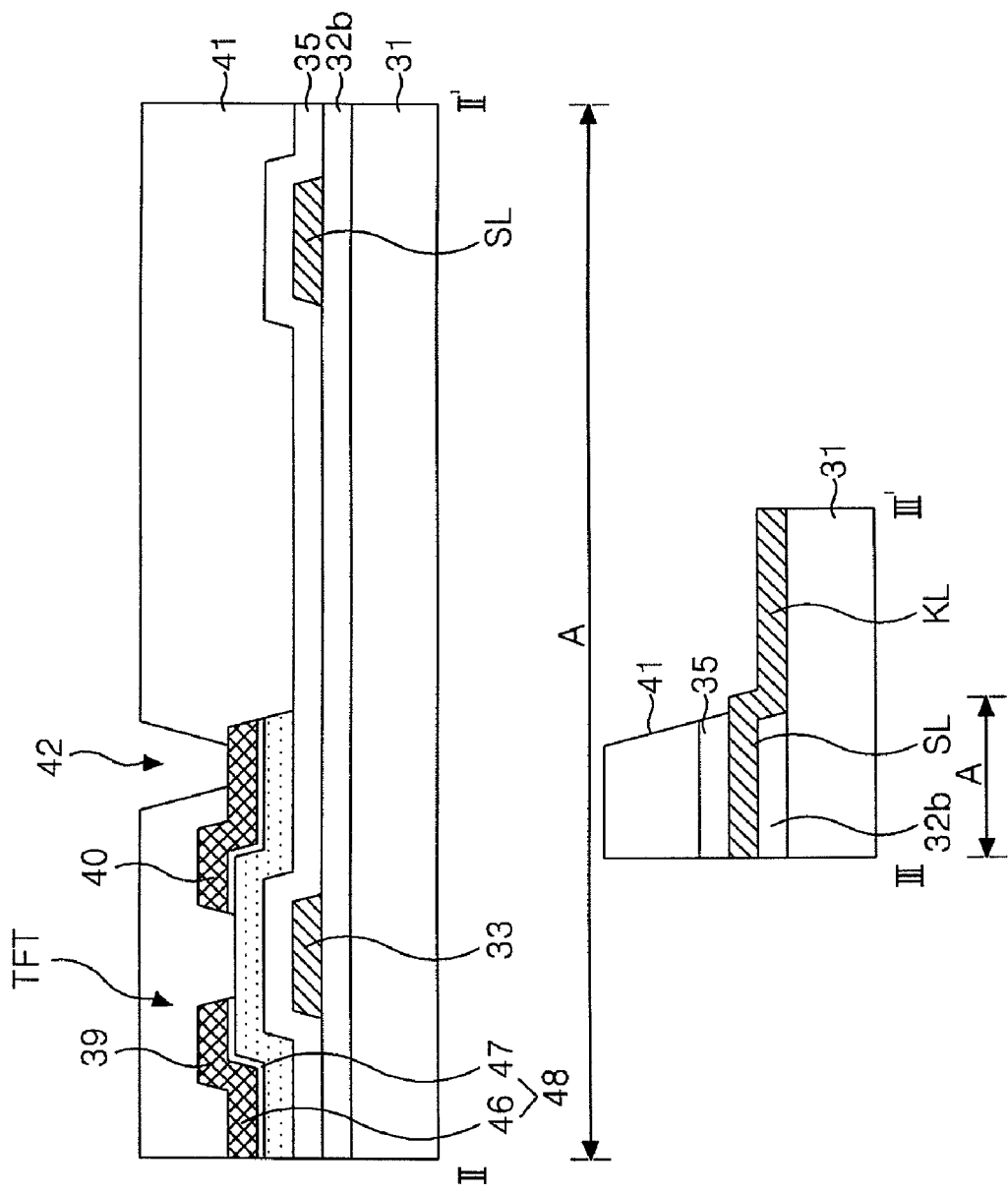
FIG. 14B is a cross section diagram illustrating the third mask process therein.

FIG. 14A is a plan diagram illustrating a third mask process in a method of manufacturing a TFT array substrate according to the second embodiment of the present disclosure, and FIG. 14B is a cross section diagram illustrating the third mask process therein. As shown in FIGS. 14A and 14B, the third mask process is performed to form a third insulation film 41 which is formed on the second insulation film 35 to cover the semiconductor pattern 48 and the source/drain pattern, wherein the third insulation film 41 includes the contact hole 42 to expose the drain electrode 40. The third insulation film 41 may be formed of an inorganic insulation material of SiOx or SiNx, or may be formed of an organic insulation material of acrylic organic compound, benzocyclobutene BCB, perfluorocyclobutane PFBC, Teflon or cytop.

Figure 15A:
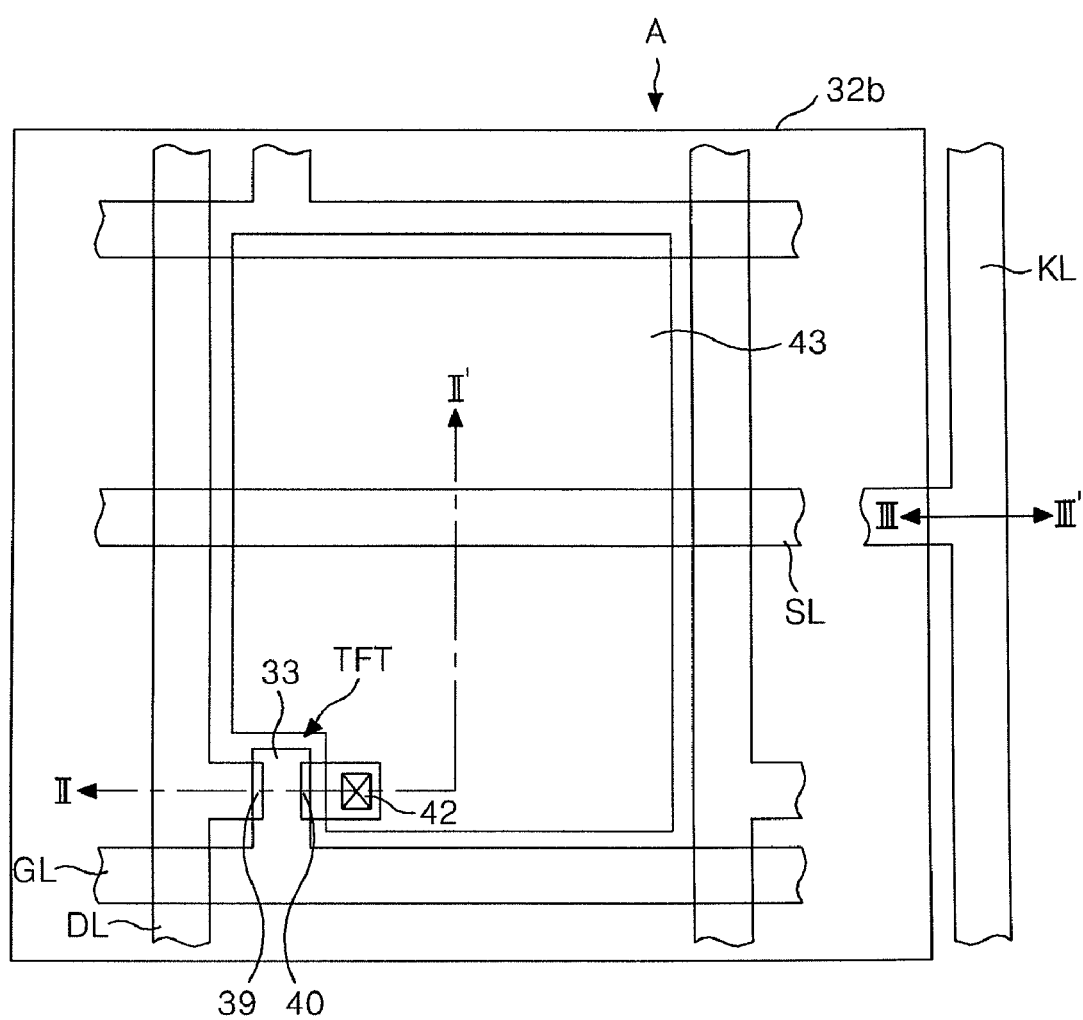
FIG. 15A is a plan diagram illustrating a fourth mask process in a method of manufacturing a TFT array substrate according to the second embodiment of the present disclosure.
Figure 15B:
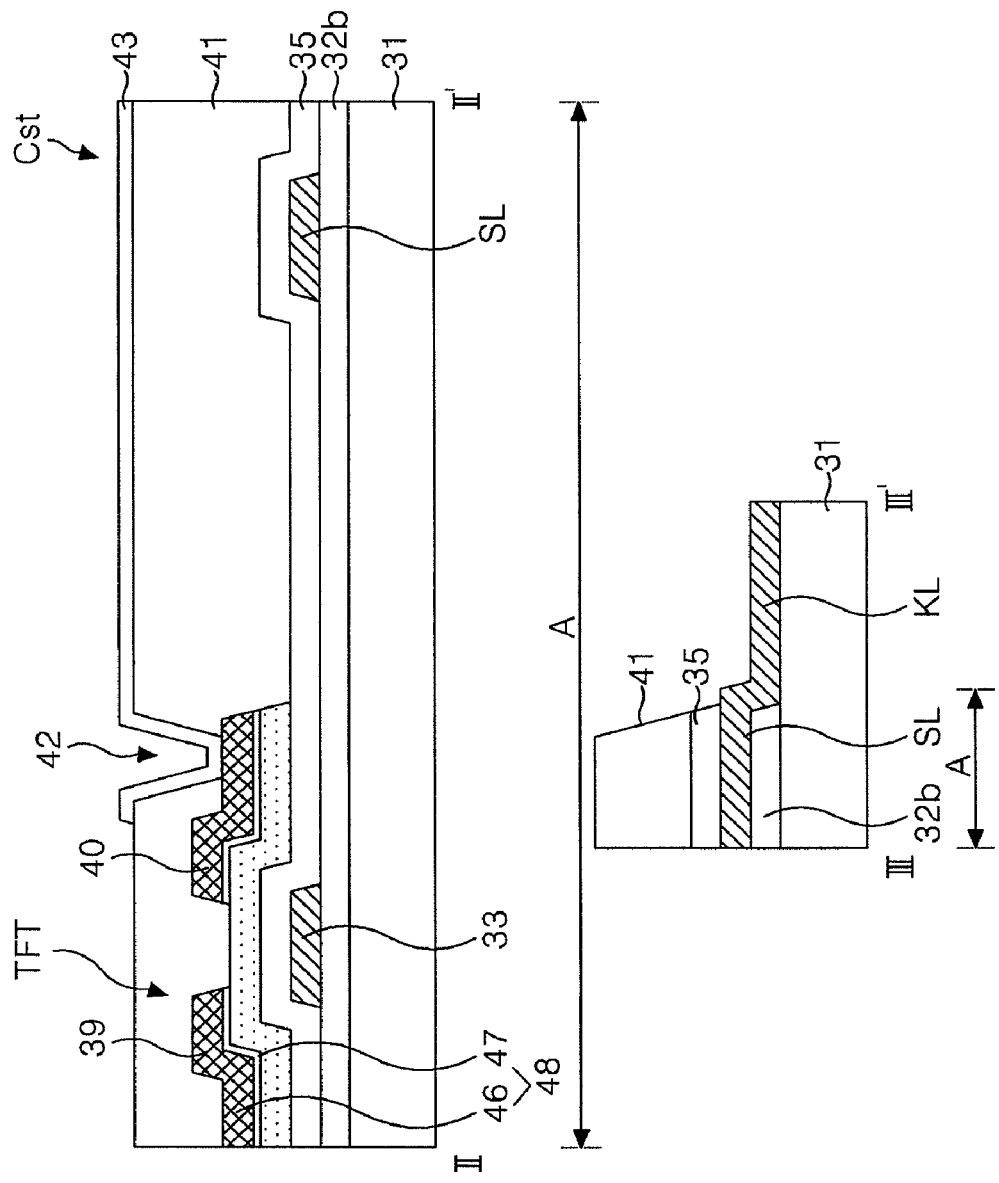
FIG. 15B is a cross section diagram illustrating the fourth mask process therein.

FIG. 15A is a plan diagram illustrating a fourth mask process in a method of manufacturing a TFT array substrate according to the second embodiment of the present disclosure, and FIG. 15B is a cross section diagram illustrating the fourth mask process therein. As shown in FIGS. 15A and 15B, the fourth mask process is performed to form the pixel electrode 43 which is connected to the drain electrode 40 through the contact hole 42. The pixel electrode 43 is formed of a transparent conductive metal material, for example, indium tin oxide ITO, tin oxide TO, indium zinc oxide IZO, or indium tin zinc oxide ITZO. In addition to the transparent conductive metal material, the pixel electrode 43 may be formed of a typical metal material of Al, AlNd or Mo.

Figure 16A:
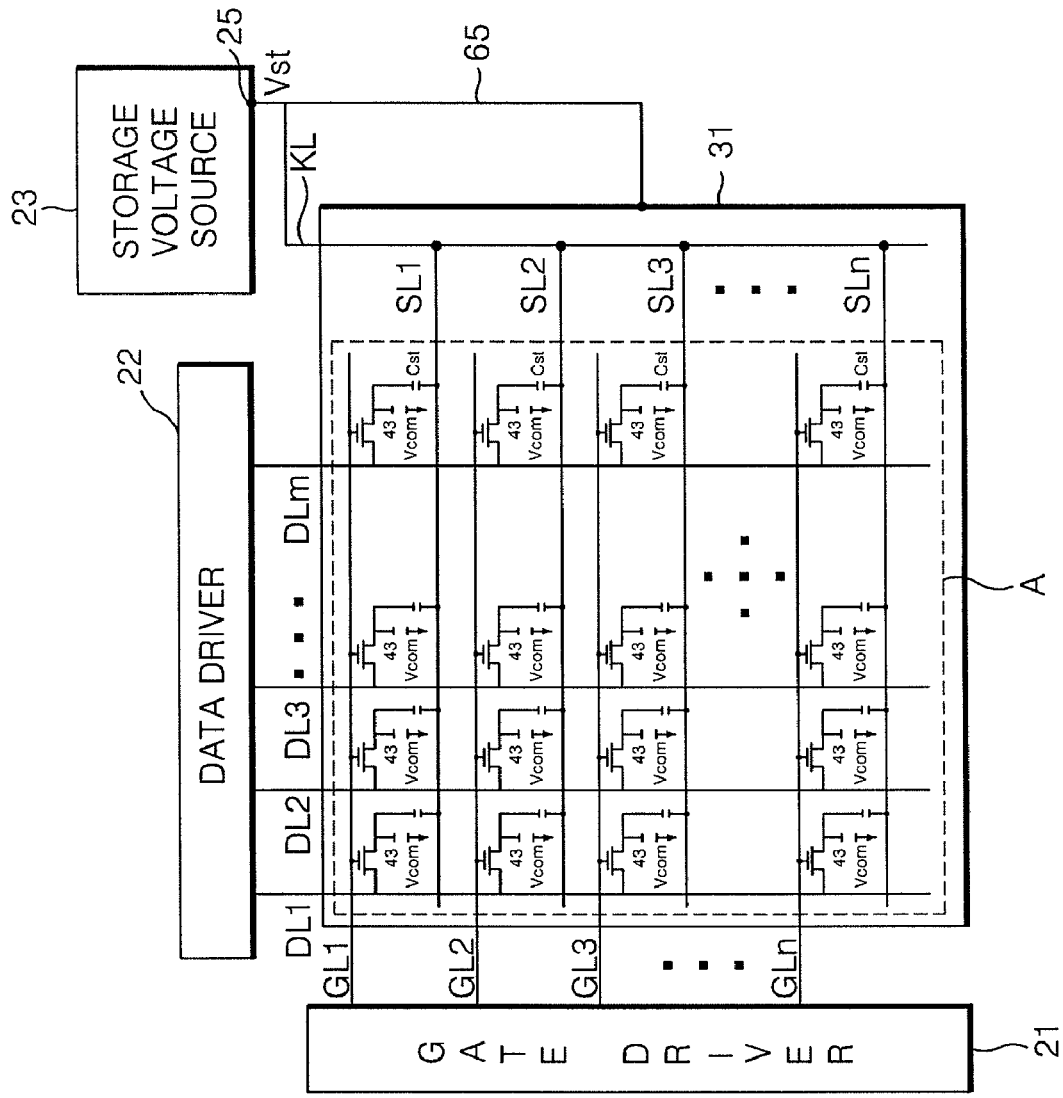
FIGS. 16A to 16c are diagrams illustrating a display device according to the third embodiment of the present disclosure.
Figure 16B:
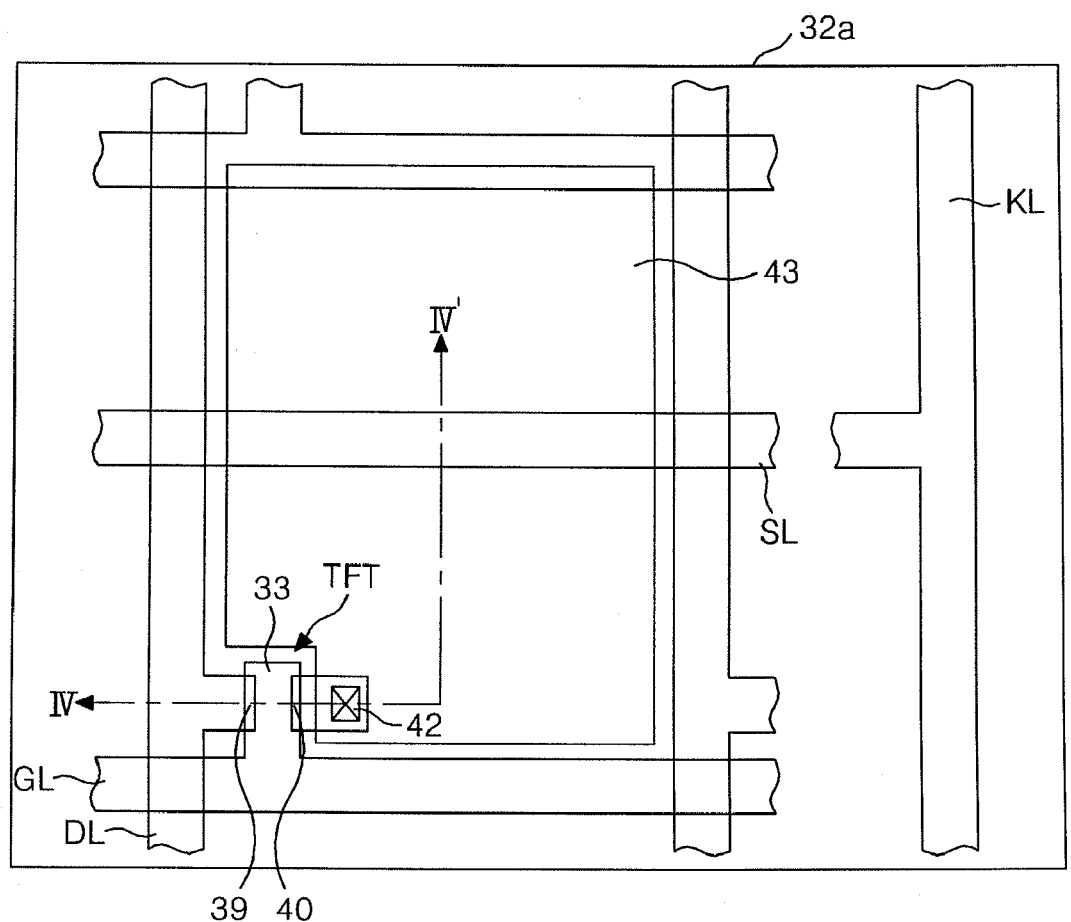
Figure 16C:
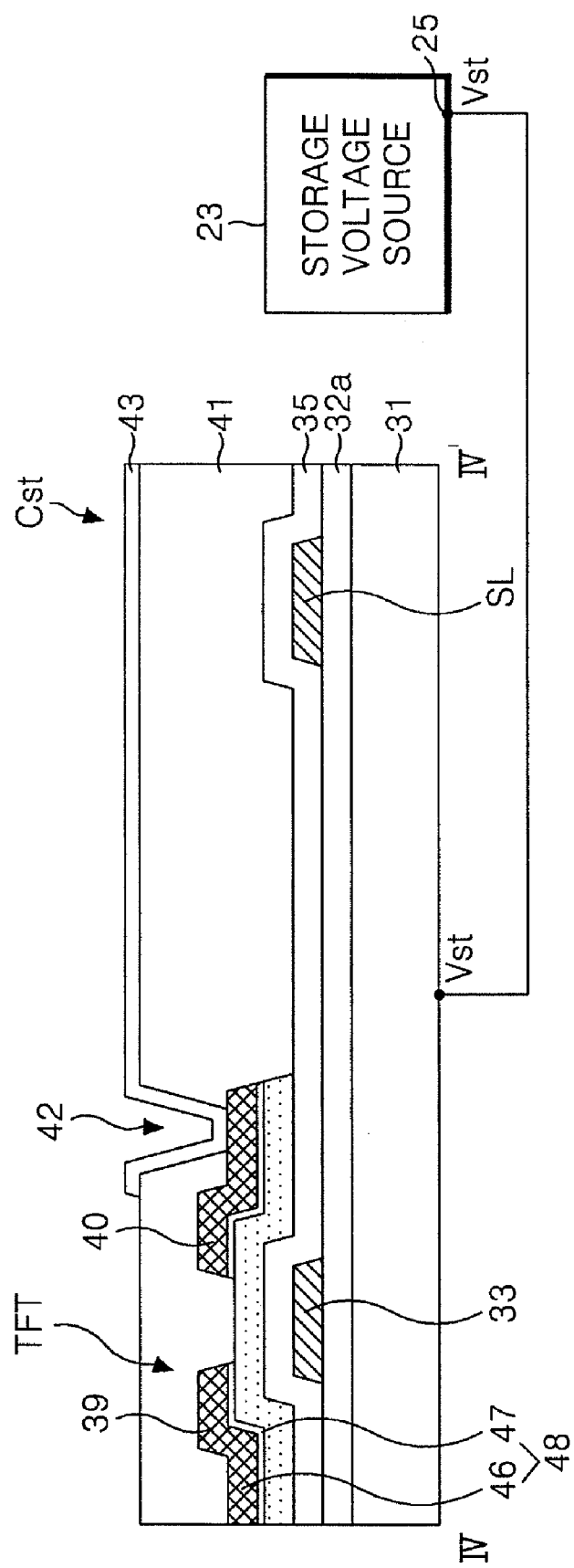

FIGS. 16A to 16c are diagrams illustrating a display device according to the third embodiment of the present disclosure. Hereinafter, the repeated explanation with reference to FIGS. 2 to 15B will be omitted.

As shown in FIG. 16A, in case of the display device according to the third embodiment of the present disclosure, an output terminal 25 of a storage voltage source 23 is connected to a metal substrate 31 by a conductive cable 65. In the display device according to the third embodiment of the present invention, a storage voltage Vst generated in the storage voltage source 23 is supplied to the metal substrate 31 by the conductive cable 65. Even though there is no contact hole passing through a first insulation film 32a formed on an entire surface of the metal substrate 31, it is possible to prevent parasitic capacitance. That is, the display device according to the third embodiment of the present invention can prevent the parasitic capacitance without limitations on a method of manufacturing the TFT array substrate.

The method of manufacturing the display device according to the third embodiment of the present disclosure includes a step of connecting the output terminal 25 of the storage voltage source 23 to the metal substrate 31 by the conductive cable 65 after forming a pixel array (TFT, Cst, GL, DL, SL, KL) on the metal substrate 31.

The preferred embodiments of the present invention may be applicable to a liquid crystal display device, an electrophoretic display device, and an organic light-emitting display device.

As mentioned above, the display device according to the present invention and the method of manufacturing the same have the following advantages.

According as any one of the storage voltage source, the storage lines and the supplying line is connected to the metal substrate, the metal substrate is used as the electrode of the storage capacitor, thereby preventing the parasitic capacitance caused by the metal substrate. Accordingly, it is possible to prevent the data voltage from being distorted by the effect of the parasitic capacitance.

As the metal substrate is connected to any one of the storage voltage source, the storage lines and the supplying line, it is unnecessary to perform the process to connect the metal substrate to an additional grounded circuit.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
    a metal substrate including a pixel array provided with a plurality of storage lines to supply a storage voltage, and a supplying line connected to the storage lines; and
    a storage voltage source, connected to the supplying line, that generates the storage voltage,
    wherein the metal substrate is connected to any one of an output terminal of the storage voltage source, the supplying line and the storage lines,
    wherein the metal substrate is directly connected to the storage lines at each pixel in the pixel array, or the metal substrate is connected to the storage lines via the supplying line, or metal substrate is connected to the storage lines via the supplying line, connected to the output terminal of the storage voltage source, and a conductive cable, connected to the metal substrate and the output terminal of the voltage source,
    wherein each pixel in the pixel array includes a storage capacitor connected to the one of the plurality of storage lines and the metal substrate is used as an electrode of the storage capacitor.

2. The display device of claim 1, wherein the pixel array comprises:
    a gate line separated from the storage line, and a gate electrode of thin film transistor connected to the gate line;
    a semiconductor pattern overlapping with the gate electrode in the area of thin film transistor;
    a data line crossing the gate line on the semiconductor pattern, a source electrode of thin film transistor connected to the data line, and a drain electrode of thin film transistor; and
    a pixel electrode overlapping with the storage line and connected to the drain electrode of thin film transistor.

3. A display device comprising:
    a metal substrate including a pixel array provided with a plurality of storage lines to supply a storage voltage;
    a first insulation film between the metal substrate and the storage lines; and
    a first contact hole passing through the first insulation film at each pixel in the pixel array, to expose the metal substrate;
    wherein each of the storage lines is directly connected to the metal substrate through the first contact hole of the each pixel, and disposed on the first insulation film, and
    wherein the each pixel includes a storage capacitor connected to the storage line and the metal substrate is used as an electrode of the storage capacitor.

4. A display device comprising:
    a metal substrate including a pixel array;
    a first insulation film on a pixel array area of metal substrate to exposed an edge of the metal substrate;
    a supplying line supplied with a storage voltage, formed in the edge of metal substrate outside the pixel array area, and directly connected to the edge of the metal substrate; and
    a plurality of storage lines, connected to the supplying line and formed on the first insulation film, which supply the storage voltage to the pixel array area, wherein the metal substrate is connected to the storage lines via the supplying line, and wherein each pixel in the pixel array includes a storage capacitor connected to the one of the plurality of storage lines and the metal substrate is used as an electrode of the storage capacitor.

5. The display device of claims 3, further comprising:
a gate line separated from the storage line and formed on the first insulation film, and a gate electrode of thin film transistor connected to the gate line;
a second insulation film to cover the gate line, the gate electrode and the storage line;
a semiconductor pattern on the second insulation film in the area of thin film transistor;
a data line crossing the gate line on the semiconductor pattern, a source electrode of thin film transistor connected to the data line, and a drain electrode of thin film transistor;
a third insulation film to cover the data line and the thin film transistor;
a second contact hole passing through the third insulation film, to expose the drain electrode of thin film transistor; and
a pixel electrode formed on the third insulation film, overlapped with the storage line and connected to the drain electrode of thin film transistor by the second contact hole.

6. The display device of claim 4, further comprising:
a gate line separated from the storage line and formed on the first insulation film, and a gate electrode of thin film transistor connected to the gate line;
a second insulation film to cover the gate line, the gate electrode and the storage line;
a semiconductor pattern on the second insulation film in the area of thin film transistor;
a data line crossing the gate line on the semiconductor pattern, a source electrode of thin film transistor connected to the data line, and a drain electrode of thin film transistor;
a third insulation film to cover the data line and the thin film transistor;
a second contact hole passing through the third insulation film, to expose the drain electrode of thin film transistor; and
a pixel electrode formed on the third insulation film, overlapped with the storage line and connected to the drain electrode of thin film transistor by the second contact hole.

7. A method of manufacturing a display device comprising:
forming a pixel array including a supplying line to supply a storage voltage and a plurality of storage lines connected to the supplying line on a metal substrate; and
connecting an output terminal of storage voltage source for generating the storage voltage to the supplying line,
wherein the metal substrate is connected to any one of the supplying line, the storage lines, and the output terminal of storage voltage source,
wherein the metal substrate is directly connected to the storage lines at each pixel in the pixel array, or the metal substrate is connected to the storage lines via the supplying line, or metal substrate is connected to the storage lines via the supplying line, connected to the output terminal of the storage voltage source, and a conductive cable, connected to the metal substrate and the output terminal of the voltage source, wherein each pixel in the pixel array includes a storage capacitor connected to the one of the plurality of storage lines and the metal substrate is used as an electrode of the storage capacitor.

8. The method of claim 7, wherein forming the pixel array comprises:
forming a gate line separated from the storage line, and a gate electrode of thin film transistor connected to the gate line, as well as the supplying line and storage lines, at the same time;
forming a semiconductor pattern overlapping with the gate electrode in the area of thin film transistor, a data line crossing the gate line and formed on the semiconductor pattern, a source electrode of thin film transistor connected to the data line, and a drain electrode of thin film transistor; and
forming a pixel electrode overlapping with the storage line and connected to the drain electrode of thin film transistor.

9. A method of manufacturing a display device comprising:
providing a metal substrate for forming a pixel array;
forming a first insulation film on the metal substrate, the first insulation film including a first contact hole passing through the first insulation film at each pixel in the pixel array, to expose the metal substrate; and
forming a pixel array including a plurality of storage lines on the first insulation film;
wherein each of the storage lines is directly connected to the metal substrate through the first contact hole of the each pixel, and disposed on the first insulation film, and
wherein the each pixel includes a storage capacitor connected to the storage line and the metal substrate is used as an electrode of the storage capacitor.

10. The method of claim 9, wherein forming the pixel array comprises forming a gate line separated from the storage line, and a gate electrode of thin film transistor connected to the gate line.

11. The method of claim 10, wherein forming the pixel array further comprises:
forming a second insulation film to cover the gate line, the gate electrode and the storage line;
forming a semiconductor pattern on the second insulation film in the area of thin film transistor, a data line crossing the gate line on the semiconductor pattern, a source electrode of thin film transistor connected to the data line, and a drain electrode of thin film transistor;
forming a third insulation film including a second contact hole to expose the drain electrode of thin film transistor; and
forming a pixel electrode on the third insulation film, overlapped with the storage line and connected to the drain electrode of thin film transistor by the second contact hole.

12. A method of manufacturing a display device comprising:
providing a metal substrate for forming a pixel array;
forming a first insulation film on the pixel array area of metal substrate to expose an edge of the metal substrate; and
forming a supplying line, supplied with a storage voltage, on the edge of metal substrate outside the pixel array area, and a plurality of storage lines, connected to the supplying line and formed on the first insulation film, for supplying the storage voltage to the pixel array area,
wherein the supplying line is directly connected to the edge of the metal substrate, wherein the metal substrate is connected to the storage lines via the supplying line, and wherein each pixel in the pixel array includes a storage capacitor connected to the one of the plurality of storage lines and the metal substrate is used as an electrode of the storage capacitor.

13. The method of claim 12, wherein forming the storage line comprises forming a gate line separated from the storage line, and a gate electrode of thin film transistor connected to the gate line.

14. The method of claim 13, further comprising:

forming a second insulation film to cover the gate line, the gate electrode and the storage line;

forming a semiconductor pattern on the second insulation film in the area of thin film transistor, a data line crossing the gate line on the semiconductor pattern, a source electrode of thin film transistor connected to the data line, and a drain electrode of thin film transistor;

forming a third insulation film including a second contact hole to expose the drain electrode of thin film transistor; and forming a pixel electrode on the third insulation film, overlapped with the storage line and connected to the drain electrode of thin film transistor by the second contact hole.

* * * * *